(12) United States Patent
Takla et al.

(10) Patent No.: US 11,321,004 B2
(45) Date of Patent: May 3, 2022

(54) HIERARCHICAL DATA BUS ARCHITECTURE IN A NETWORK FUNCTIONS VIRTUALIZATION SYSTEM

(71) Applicant: Verizon Patent and Licensing Inc., Arlington, VA (US)

(72) Inventors: Mourad B. Takla, Hillsborough, NJ (US); Fernando Oliveira, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/210,084

(22) Filed: Dec. 5, 2018

(65) Prior Publication Data

US 2020/0183603 A1 Jun. 11, 2020

(51) Int. Cl.
*G06F 3/06* (2006.01)
*G06F 9/455* (2018.01)
*G06F 13/362* (2006.01)

(52) U.S. Cl.
CPC .......... *G06F 3/0644* (2013.01); *G06F 3/0607* (2013.01); *G06F 3/0655* (2013.01); *G06F 3/0685* (2013.01); *G06F 9/45533* (2013.01); *G06F 13/362* (2013.01); *G06F 2009/45583* (2013.01)

(58) Field of Classification Search
CPC .. G06F 11/3072; G06F 3/0644; G06F 3/0607; G06F 3/0655; G06F 3/0685; G06F 9/45533; G06F 13/362; G06F 2009/45583
See application file for complete search history.

(56) References Cited

U.S. PATENT DOCUMENTS

| | | | |
|---|---|---|---|
| 2015/0248462 A1* | 9/2015 | Theeten | G06F 16/24524 707/688 |
| 2016/0357778 A1* | 12/2016 | MacKenzie | G06F 16/178 |
| 2019/0095265 A1* | 3/2019 | Dome | H04L 41/147 |
| 2019/0349275 A1* | 11/2019 | Chen | H04L 12/403 |
| 2019/0349422 A1* | 11/2019 | Dhruvakumar | H04L 67/1002 |
| 2020/0097503 A1* | 3/2020 | Zhao | G06F 16/907 |

OTHER PUBLICATIONS

"Apache Kafka: A distributed streaming platform" website (accessed Oct. 25, 2018). Retrieved from http://kafka.apache.org/.
"ONAP: Open Network Automation Platform" website (accessed Oct. 25, 2018). Retrieved from https://www.onap.org/.

* cited by examiner

*Primary Examiner* — Muhammad Raza

(57) ABSTRACT

An inter-bus hub, within a hierarchical data bus system, has a partitioned log that includes a first partition and a second partition, where the inter-bus hub is coupled to a first data bus residing in a first segment and to a second data bus residing in a second segment. The inter-bus hub aggregates, based on at least one set of rules, first data from the first data bus, and stores the first data in the first partition. The inter-bus hub aggregates, based on the at least one set of rules, second data from the second data bus, and stores storing the second data in the second partition. The inter-bus hub relays the first data from the first partition to a first destination and relays the second data from the second partition to a second destination.

20 Claims, 18 Drawing Sheets

US 11,321,004 B2

HIERARCHICAL DATA BUS ARCHITECTURE IN A NETWORK FUNCTIONS VIRTUALIZATION SYSTEM

BACKGROUND

A virtual machine (VM) includes a software-based emulation of a physical computer. A characteristic of a VM is that its software is limited to the resources and abstractions provided by the VM, such that the VM cannot escape the boundaries of its virtual environment. VMs are classified into two different classifications: 1) a system virtual machine; or 2) a process virtual machine. A system VM machine provides a complete system platform that supports the execution of an entire operating system and emulates an existing architecture. With a system VM, multiple operating system environments can co-exist on a same computer in isolation from each other. A system VM can provide an instruction set architecture that is different from that of the real machine. A process VM supports a single process and is typically portable and flexible. A process VM runs as a normal application inside a host operating system and provides a platform-independent runtime environment that allows a program to execute in a same manner on any platform.

A VM includes an operating system (OS) or application that is executed in the context of software called a hypervisor, which emulates, or virtualizes, dedicated hardware. A hypervisor executes on a computer and receives a request to launch a virtual machine. The request includes a pointer (e.g., a path name) to an image that is to be used. The hypervisor retrieves the image, creates a volume from the contents of the image, and then launches a controlled execution environment that executes a bootloader stored on the volume created. The VM executes under the control of the hypervisor, and many VMs can be executed on a single physical machine. Each VM typically has its own copy of the operating system and components required to run the operating system and the applications therein.

Virtual Network Functions (VNFs) include network functions that have been moved into software that runs on commodity hardware. As networks move to a Software Defined Network (SDN) model, dedicated hardware devices/components, that have traditionally implemented particular network functions, are being replaced by VNFs. VNFs may be executed as one or more VMs on top of the hardware networking infrastructure. VNFs can be considered as building blocks and can be connected or combined together to provide multiple capabilities required to provide a networking communication service. For example, VNFs can be linked together in a process known as service chaining. Traditionally, new network services and functions have been installed manually and configured within dedicated hardware devices. VNFs, however, eliminate the need for specific hardware since new functions can be quickly deployed as one or more VMs. VNFs typically increase network scalability and agility, while enabling better use of network resources. VNFs additionally reduce power consumption and reduce the use of available physical space due to VNFs replacing physical hardware. VNFs, thus, reduce operational and capital expenditures. Examples of various VNFs include switches, routers, servers, tunneling gateway elements, traffic analysis functions, mobile network nodes (e.g., Home Location Register (HLR), Home Subscriber Server (HSS), Mobility Management Entity (MME), Serving General Packet Radio Services (GPRS) Support Node (SGSN), Gateway GPRS Support Node (GGSN), Packet Data Network (PDN) gateway), and security functions (e.g., firewalls, intrusion detection systems, virus scanners, spam protection).

Network functions virtualization (NFV) is a network architecture that virtualizes classes of network node functions (e.g., VNFs) into building blocks that may connect, or chain together, to create network services. Network services have traditionally run on proprietary, dedicated hardware. With NFV, network service functions are packaged as VMs on commodity hardware. A NFV architecture typically includes a network functions virtualization infrastructure (NFVI) and a network functions virtualization management and orchestration architectural framework (NFV-MANO). NFVI includes the hardware and software components that build the environment where VNFs are deployed. The NFVI can span several different locations, with connectivity between the locations. The NFV-MANO includes a collection of functional blocks, data repositories, and interfaces through which the functional blocks of the NFV-MANO exchange information to manage and orchestrate the NFVI and VNFs.

DETAILED DESCRIPTION OF THE PREFERRED EMBODIMENTS

Figure 1:
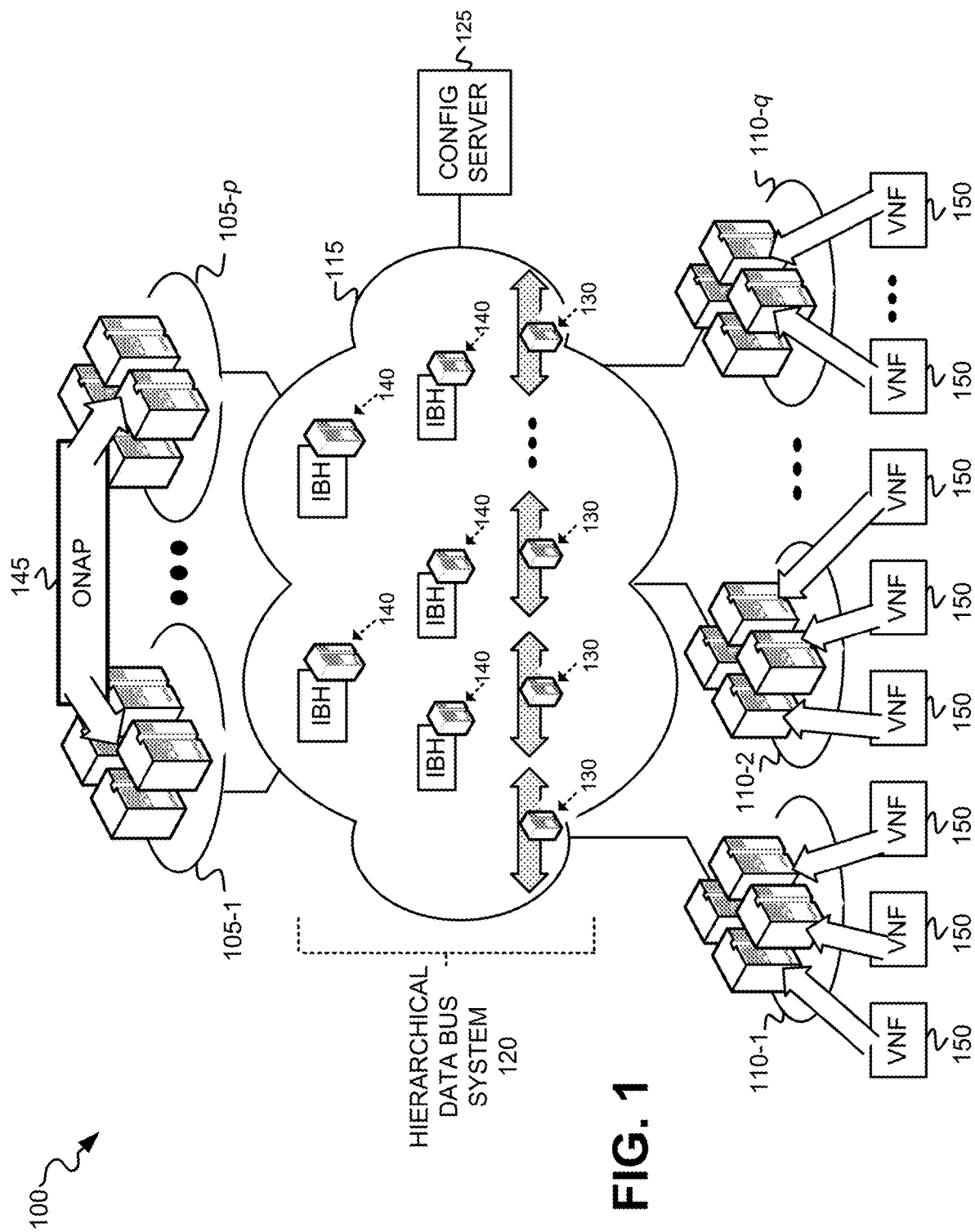
FIG. 1 depicts an exemplary distributed network environment in which a hierarchical bus-based system may be implemented.

The following detailed description refers to the accompanying drawings. The same reference numbers in different drawings may identify the same or similar elements. The following detailed description does not limit the invention.

The Open Networks Automation Platform (ONAP) architecture (referred to herein as "ONAP") is one example of an NFV-MANO of an NFV architecture. The ONAP provides a common platform for real-time, policy-driven orchestration and automation of physical network and virtual network functions that enable the rapid deployment, automation, and lifecycle management of new services using VNFs. The ONAP enables VNFs, and other network functions and services, to be interoperable in an automated, real-time environment. Therefore, with ONAP, network operators can synchronously orchestrate physical and virtual network functions. The ONAP's run-time environment executes the rules and policies distributed by a design and creation environment, and executes controllers that orchestrate, monitor, and manage the physical and virtual network functions and services.

As modern networks transition into using software-based network service functions, these networks are utilizing VNFs to replace hardware-centric approaches. With this transition, as the VNFs are deployed, more data exchange is required to configure, monitor, and manage the VNFs throughout their lifecycle by, for example, the ONAP or other type of NFV-MANO. The deployment of Fifth Generation (5G) cellular mobile communications and Mobile Edge Computing (MEC) will require the ability to automate the process of deploying and managing the various components of which large and complex networks are comprised.

Exemplary implementations described herein use a hierarchical data bus system that employs multiple data buses, interconnected via multiple inter-bus hubs in a hierarchical manner, to provide interconnectivity for the entire NFV system. Configuring, monitoring, and/or managing VNFs by the NFV-MANO utilizes the hierarchical data bus system to carry configuration information, various errors, network element status information, control information and other information between the NFV-MANO components (e.g., ONAP components) and/or the VNFs. Through use of this hierarchical data bus system, each of the multiple data buses may be organized as a single segment having a limited scope (e.g., limited geographically, or limited technologically). Separate segments may be interconnected via the inter-bus hubs to share data as needed. To allow data buses in various segments to interconnect with one another, inter-bus hubs (IBHs) are deployed to provide local terminations and interfaces for the data buses. An IBH terminates data traffic and allows inter-bus communication, bridges traffic between different data buses or provides an interface point to the rest of the system, allows routing of traffic between the different data buses, isolates data between the data buses through the creation and use of a partitioned log at the IBH that can consume data from local data buses and re-publish them for consumption by other segments or by other IBHs, and buffers data between the different data buses to allow different regions to communicate at different rates. The hierarchical data bus system described herein, thus, enables the network traffic to be separated by region (e.g., east vs. west), technology (e.g., 5G vs. 4G, wireless vs. wireline) or other criteria, reduces traffic overhead, limits the impact of local outages to a regional or technology area, avoids broadcast storms or large bursts of error statuses, reduces delay in response to local events, and limits the amount of storage and computation required to deal with large amounts of centralized messages coming from a large number of network elements deployed globally.

FIG. 1 depicts an exemplary distributed network environment 100 in which a hierarchical bus-based system may be implemented. As shown, distributed network environment 100 includes server clusters 105-1 through 105-$p$ (where p is greater than or equal to one), server clusters 110-1 through 110-$q$ (where q is greater than or equal to one), a distributed network (s) 115, a hierarchical data bus system 120, and a configuration server 125. As further shown, hierarchical data bus system 120 may include multiple data buses 130 and multiple inter-bus hubs (IBHs) 140 that are interconnected in a hierarchical architecture (details not shown in FIG. 1). Each data bus 130 may include a Data Movement as a Platform (DMaaP) system that provides a data movement service that transports and processes data from any source (i.e., a "producer") to any target (i.e., a "consumer"). One example of a DMaaP system includes a Kafka Bus that further includes a distributed streaming platform that publishes streams of records from producers/contributors to consumers, stores the streams of records in a fault-tolerant durable manner, and processes the streams of records. A Kafka bus runs as a cluster of one or more servers that store streams of records in categories called topics. Each record in a topic may include, for example, a key, a value, and a timestamp. In a data bus 130, such as a Kafka bus, a producer contributes a stream of records to one or more topics. A consumer subscribes to the one or more topics, and selectively retrieves records of subscribed topics for consumption. Each inter-bus hub 140 includes one or more servers where each of the servers includes a network device, such as a network connected computer, into which inter-bus functionality may be deployed. Each IBH 140 may interconnect, as described in further detail below, with one or more data bus segments and with one or more other IBHs 140 in a hierarchical manner. Each of the data bus segments (not shown in FIG. 1) may include a data bus 130 and one or more producers and/or consumers.

Server clusters 105-1 through 105-$p$ (individually and generically referred to herein as "server clusters 105" or "server cluster 105") may each include a cluster of multiple servers, such as, for example, multiple interconnected network devices. Each one of the servers of a server cluster 105 may include a network device, such as a network connected computer, into which components of an Open Networks Automation Platform (ONAP) 145 may be deployed. Though described herein in the context of an ONAP architecture/system, ONAP 145 may alternatively include any type of network functions virtualization (NFV) architecture/system that orchestrates, automates, and manages services using VNFs. Therefore, the various components of ONAP 145 may run in multiple different servers of one or more server clusters 105. Each of server clusters 105 may, for example, include a data center. Server clusters 105 may each connect, either directly or indirectly, to network(s) 115. In some embodiments, each server of server clusters 105 may connect directly to network 115, or may connect indirectly to network 115 via another network (e.g., via a local area network (LAN)(not shown)).

Server clusters 110-1 through 110-q (individually and generically referred to herein as "server clusters 110" or "server cluster 110") may each include a cluster of multiple servers, such as, for example, multiple interconnected network devices. Each one of the servers of a server cluster 110 may include a network device, such as a network connected computer or network connected data center, into which one or more VNFs 150 may be installed and executed. Server clusters 110 may serve as the NFVI within network environment 100 and, therefore, include the hardware and software components for the architecture where VNFs are deployed. As shown, the NFVI can span several different server clusters 110, with the clusters 110 possibly residing at different locations and including connectivity between the different locations. Each server cluster 110 of the NFVI may run at least one VNF 150. ONAP 145 may monitor, manage, and/or control the VNFs 150 running at each server cluster 110 via network(s) 115. In some embodiments, each server of server clusters 110 may connect directly to network 115, or may connect indirectly to network 115 via another network (e.g., via a local area network (LAN)(not shown)).

Network(s) 115 may include one or more networks of various types including, for example, a Public Switched Telephone Network (PSTN), a wireless network, a LAN, a wide area network (WAN), a metropolitan area network (MAN), an intranet, or the Internet. The wireless network may include a satellite network, a Public Land Mobile Network (PLMN), and/or a wireless LAN or WAN (e.g., Wi-Fi).

Configuration server 125 may include one or more network devices that enable the configuration of each data bus 130 and each IBH 140 for creating and maintaining hierarchical data bus system 120.

The configuration of components of distributed network environment 100 in FIG. 1 is for illustrative purposes. Other configurations may be implemented. Therefore, network environment 100 may include additional, fewer and/or different components/nodes that may be configured in a different arrangement from that depicted in FIG. 1.

Figure 2:
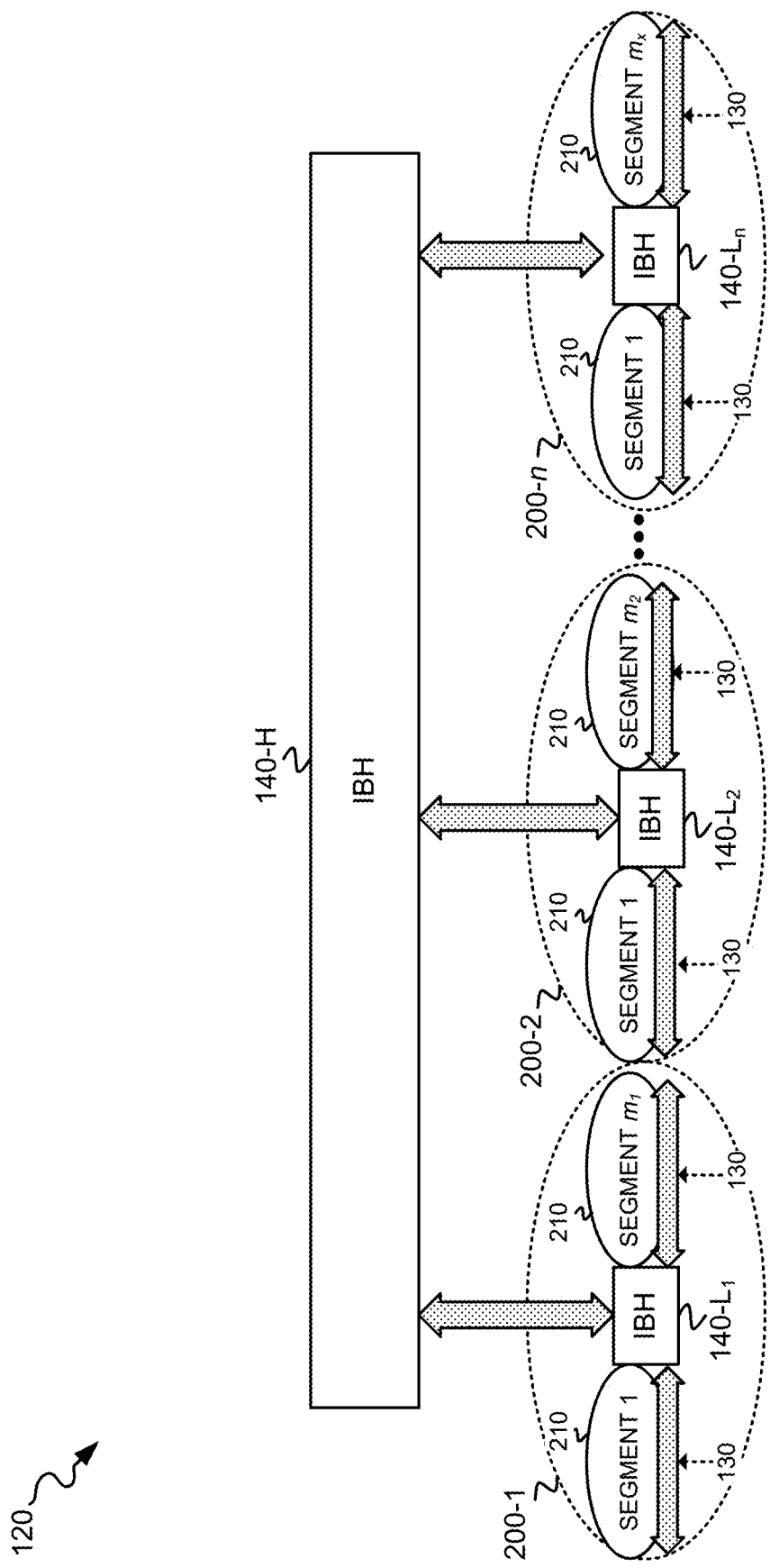
FIG. 2 depicts one exemplary implementation of the hierarchical data bus system of FIG. 1.

FIG. 2 depicts one exemplary implementation of hierarchical data bus system 120. In the exemplary implementation of FIG. 2, the hierarchical data bus system 120 includes multiple lower level IBHs 140-L interconnected with a single higher level IBH 140-H. In the hierarchical data bus system 120 of FIG. 2, each lower level IBH 140-L is considered "adjacent" to the higher level IBH 140-H. Each lower level IBH 140-L acts as an inter-hub bus for multiple data bus segments 210, where each data bus segment 210 includes its own data bus 130, and at least one producer (not shown) and/or consumer (not shown). Each lower level IBH 140-L may be associated with an IBH region 200 that includes the IBH 140-L and multiple data bus segments 210. Each lower level IBH 140-L may serve as a data aggregation and data relay node for retrieving data from data buses 130 at connected data bus segments 210, and conveying the retrieved data to the higher level IBH 140-H for storing in an appropriate partitioned log (e.g., topic). Each lower level IBH 140-L may also bridge traffic between a first data bus segment 210 connected to IBH 140-L to a second data bus segment 210 connected to IBH 140-L. Each lower level IBH 140-L may additionally bridge traffic between the higher level IBH 140-H and a data bus 130 associated with any data bus segment 210 connected to the lower level IBH 140-L, and between any data bus segment 210 connected to the lower level IBH 140-L to the higher level IBH 140-H.

Figure 3:
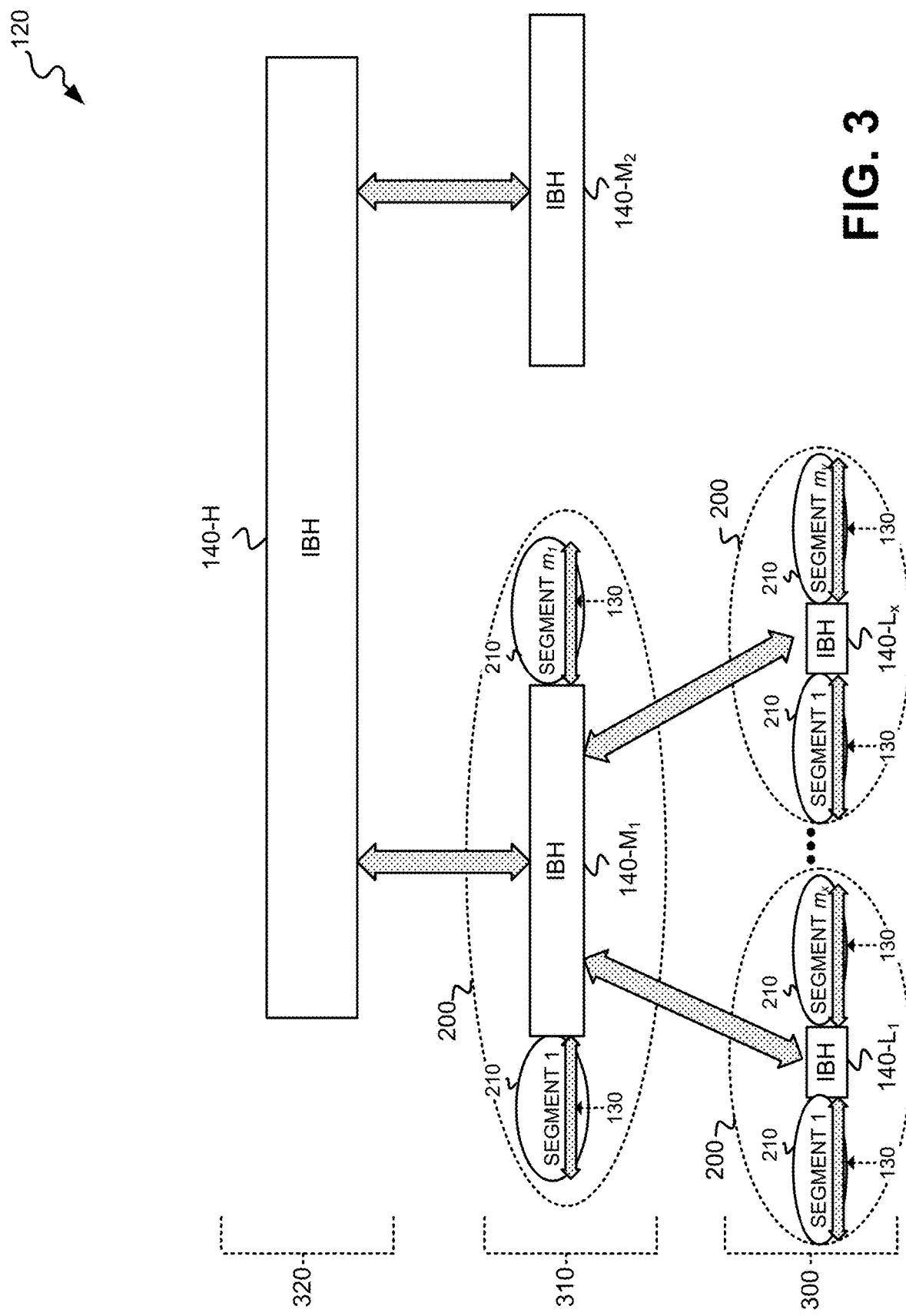
FIG. 3 depicts another exemplary implementation of the hierarchical data bus system of FIG. 1.

FIG. 3 depicts another exemplary implementation of hierarchical data bus system 120. In the exemplary implementation of FIG. 3, the hierarchical data bus system 120 includes three hierarchical levels 300, 310 and 320, where the lowest level 300 includes multiple data bus segments 210 connected to multiple different lower level IBHs 140-L, the mid-level 310 includes multiple mid-level IBHs 140-M connected to the multiple lower level IBHs 140-L, and the highest level 320 includes a single high level IBH 140-H connected to the multiple different mid-level IBHs 140-M. In the hierarchical data bus system 120 of FIG. 3, each depicted lower level IBH 140-L is considered adjacent to the mid-level IBH $140\text{-}M_1$. In turn, both depicted mid-level IBHs $140\text{-}M_1$ and $140\text{-}M_2$ are considered adjacent to the higher level IBH 140-H.

Each lower level IBH 140-L acts as an inter-hub bus for multiple data bus segments 210, where each data bus segment 210 includes its own data bus 130, and at least one producer (not shown) and/or consumer (not shown). Each lower level IBH 140-L may be associated with an IBH region 200 that includes the IBH 140-L and multiple data bus segments 210. Each lower level IBH 140-L may serve as a data aggregation and data relay node for retrieving data from data buses 130 at connected data bus segments 210, and conveying the retrieved data to a mid-level IBH 140-M for storing in an appropriate IBH partitioned log (e.g., topic) or for forwarding to a destination data bus segment 210 connected to the mid-level IBH 140-M. Each lower level IBH 140-L may bridge traffic between a first data bus segment 210 connected to IBH 140-L to a second data bus segment 210 connected to the same IBH 140-L, or between the first data segment 210 connected to IBH 140-L to a second data bus segment 210 connected to a mid-level IBH 140-M. Each lower level IBH 140-L may additionally bridge traffic between a mid-level IBH 140-M and a data bus 130 associated with any data bus segment 210 connected to the lower level IBH 140-L, and between any data bus segment 210 connected to the lower level IBH 140-L to the mid-level IBH 140-M.

Each mid-level IBH 140-M may be associated with an IBH region 200 that includes the IBH 140-M and multiple data bus segments 210. Each mid-level IBH 140-M may serve as a data aggregation and data relay node for retrieving data from data buses 130 at connected data bus segments 210, and conveying the retrieved data to higher level IBH 140-H for storing in an appropriate IBH partitioned log (e.g., topic) or conveying the retrieved data to a lower level IBH 140-L for storing in appropriate IBH partitioned log (e.g., topic) or forwarding to a destination data bus segment 210 connected to the lower level IBH 140-L. Each mid-level IBH 140-M may bridge traffic between a first data bus segment 210 connected to IBH 140-M to a second data bus segment 210 connected to the same IBH 140-M, or between the first data segment 210 connected to IBH 140-M to a second data bus segment 210 connected to a low level IBH 140-L. Each mid-level IBH 140-M may additionally bridge traffic between high level IBH 140-H and a data bus 130 associated with any data bus segment 210 connected to the mid-level IBH 140-M, and between any data bus segment 210 connected to the mid-level IBH 140-M to the high level IBH 140-H.

Though FIG. 2 depicts an implementation having a two-level hierarchical data bus system 120, and FIG. 3 depicts an implementation having a three-level hierarchical data bus system 120, hierarchical data bus system 120, as described herein, may generally include n levels of data bus hierarchy, where n is greater than or equal to two. For example, hierarchical data bus system 120 may include 4, 5, or 6 levels of data bus hierarchy. FIGS. 1-3 show implementations of hierarchical data bus system 120 in which IBHs 140 operate in a "pass through" mode in which data may be relayed from one segment to another, or from one IBH to another IBH, via one or more topics. In this "pass through" mode, the IBHs 140 may be used only for traffic transportation, and may not engage in any data summarization and analysis for data aggregated, stored, and/or relayed by the IBHs 140. In the "pass through" mode, however, intermediate analysis of data may be performed within each local segment and the analysis data may be aggregated and communicated via each IBH 140 to other segments. Additional implementations of hierarchical data bus system 120 may have IBHs 140 operating in a "data summarization" mode. In this "data summarization" mode, analysis and summarization of data aggregated, stored, and/or relayed by the IBHs 140 may be performed at each IBH 140, in addition to being performed at each data bus 130, and this analysis data may be collected for viewing by, for example, an administrator or end-to-end system designer. The analysis data that results from the "data summarization" mode may be used by the administrator or the end-to-end system designer to decide how to interconnect the various segments 210 and the various IBHs 140, and how to manage the segments independently from other segments.

Figure 4:
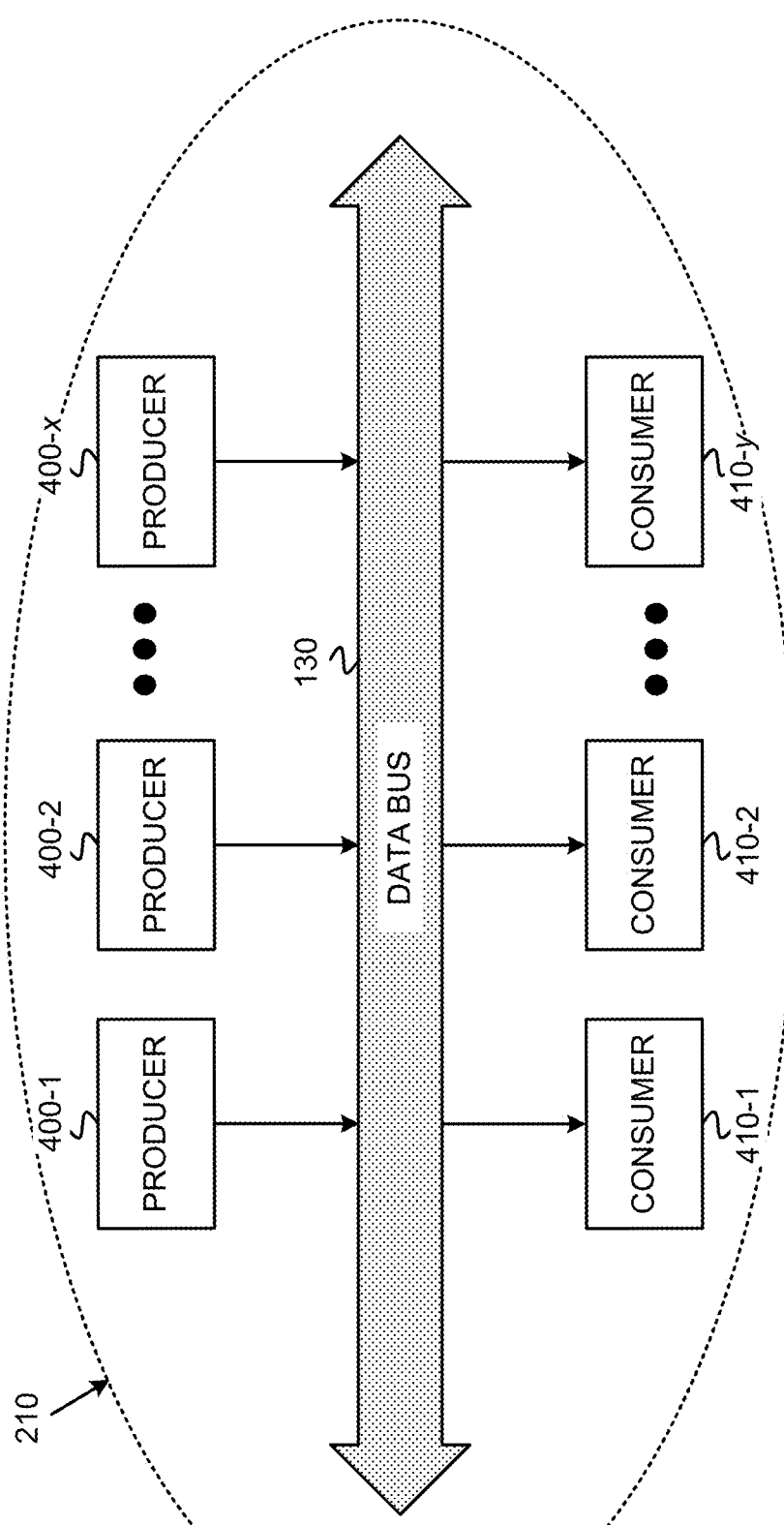
FIG. 4 depicts an example of a data bus segment of FIGS. 2 and 3.

FIG. 4 depicts an example of a local data bus segment 210. As shown, data bus segment 210 may include a data bus 130, one or more producers 400-1 through 400-x (where x may be greater than or equal to one), and one or more consumers 410-1 through 410-y (where y may be greater than or equal to one). Each one of producers 400-1 through 400-x (referred to herein as "producer 400" or "producers 400") includes a network entity, such as a component of ONAP 145 or a VNF 150, that produces data for contributing to a record of a partition (described further below) of a data bus 130. Each one of consumers 410-1 through 410-y (referred to herein as "consumer 410" or "consumers 410") includes a network entity, such as a component of ONAP 145 or a VNF 150, that retrieves and reads data stored in a record of a partition of a data bus 130. In some implementations, a particular data bus segment 210 may include at least one producer 400, at least one consumer, or may include multiple producers 400 and multiple consumers 410.

Figure 5:
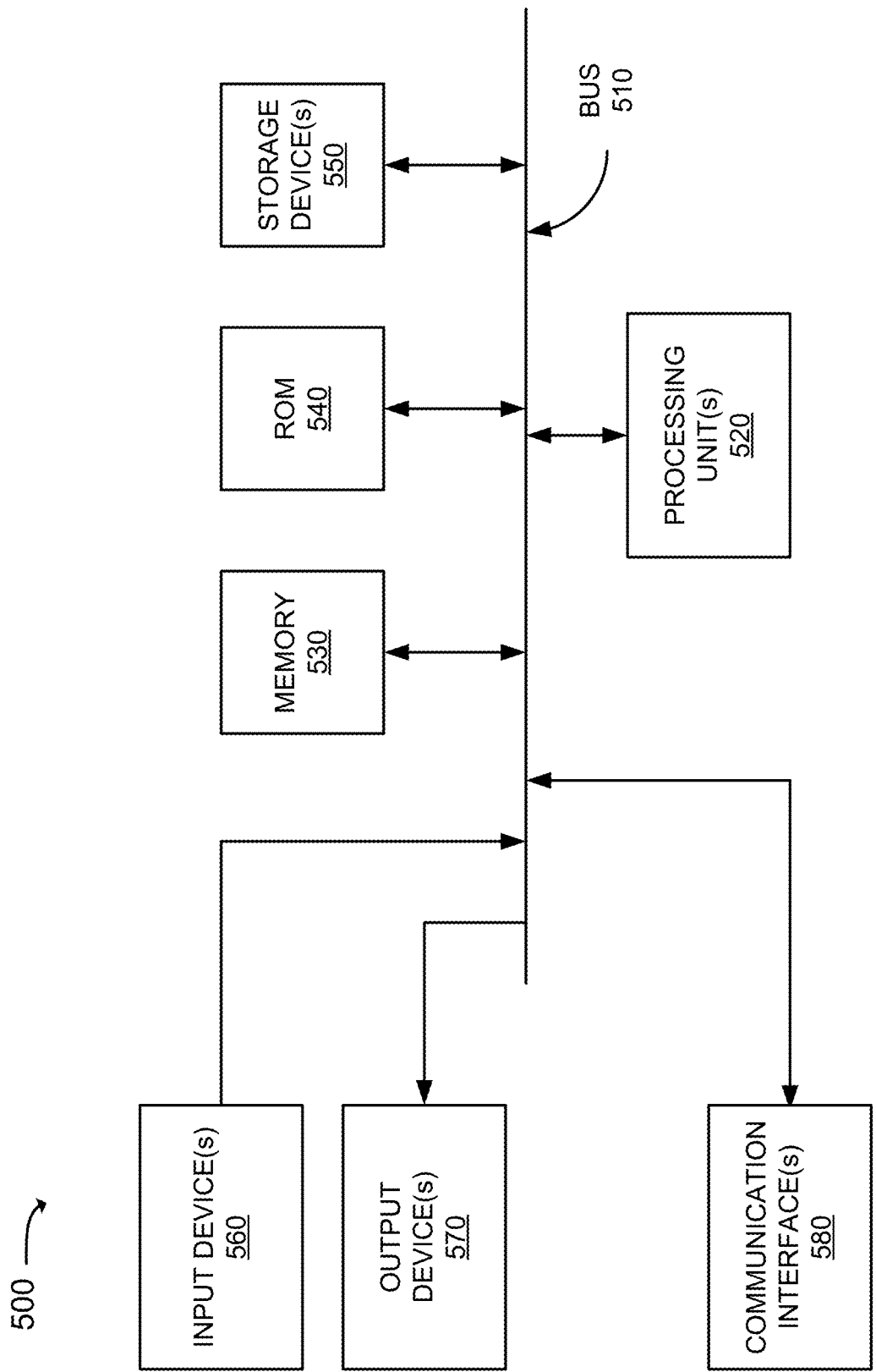
FIG. 5 depicts exemplary components of a network device that may correspond to a server of the server clusters, the data buses, the inter-bus hubs, and the configuration server of FIG. 1.

FIG. 5 is a diagram that depicts exemplary components of a network device 500. Each server of server clusters 105 and 110, each data bus 130, each IBH 140, and configuration server 125 may include at least one device configured similarly to network device 500, possibly with some variations in components and/or configuration.

Network device 500 may include a bus 510, a processing unit 520, a main memory 530, a read only memory (ROM) 540, a storage device 550, an input device 560, an output device 570, and a communication interface 580. Bus 510 may include a path that permits communication among the elements of network device 500.

Processing unit 520 may include one or more processors or microprocessors which may interpret and execute instructions, or processing logic that may perform certain operations. Memory 530 may include a random access memory (RAM) or another type of dynamic storage device that may store information and instructions for execution by processing unit 520. Read Only Memory (ROM) 540 may include a ROM device or another type of static storage device that may store static information and instructions for use by processing unit 520. Storage device 550 may include a magnetic and/or optical recording medium. Main memory 530, ROM 540 and storage device 550 may each be referred to herein as a "non-transitory computer-readable medium" or a "non-transitory storage medium."

Input device 560 may include one or more mechanisms that permit an operator (or user) to input information to network device 500, such as, for example, a keypad or a keyboard, a display with a touch sensitive panel, voice recognition and/or biometric mechanisms, etc. Output device 570 may include one or more mechanisms that output information to the operator, including a display, a speaker, etc. Communication interface 580 may include one or more transceivers that enable network device 500 to communicate with other devices and/or systems. For example, communication interface 580 may include a wired or wireless transceiver for communicating with other network devices 500 of a same server cluster 105 or 110, other network devices 500 of a different server cluster 105 or 110, or other devices (e.g., configuration server 125), via network(s) 115.

The configuration of components of network device 500 in FIG. 5 is for illustrative purposes only. Other configurations may be implemented. Therefore, network device 500 may include additional, fewer and/or different components, or differently arranged components, from those depicted in FIG. 5.

Figure 6:
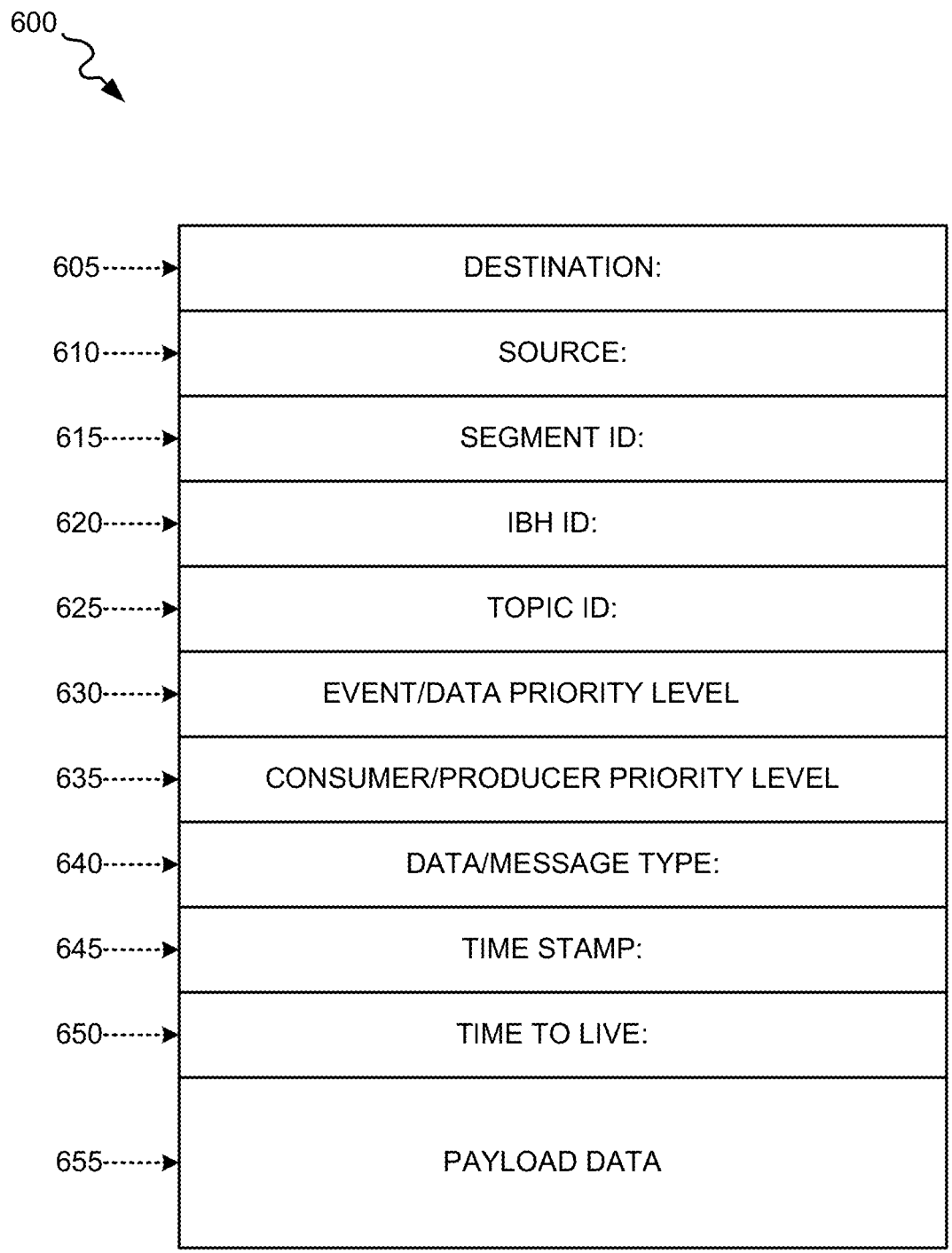
FIG. 6 depicts an exemplary format of a data unit that may be used for contributing/publishing data to a data bus or inter-bus hub, or for consuming/retrieving data from a data bus or inter-bus hub.

FIG. 6 depicts an exemplary format of a data unit 600 that may be used for contributing/publishing data to a data bus 130 or IBH 140 (e.g., a write request data unit), or for consuming/retrieving data from a data bus 130 or IBH 140 (e.g., a read request data unit). Data unit 600 may include any type of encapsulated data, or other type of data, such as, for example, a packet, a datagram, a cell; a fragment of a packet, datagram, or cell; or a combination of multiple packets, datagrams or cells. As shown, data unit 600 may include a destination field 605, a source field 610, a segment identifier (ID) field 615, an inter-bus hub (IBH) ID field 620, a topic ID field 625, an event/data priority level field 630, a consumer/producer priority level field 635, a data/message type field 640, a time stamp field 650, a time to live field 655, and one or more payload data fields 660. When received at a data bus 130 or an IBH 140, a data unit 600 may be stored as a record in a partition/topic of a partitioned log of the data bus 130 or IBH 140, as described with respect to FIGS. 7 and 8 below.

Destination field 605 stores an address (e.g., Internet Protocol (IP) address, Media Access Control address, ONAP component ID) or a label of the destination to which the data unit 600 is being sent for consumption. In some circumstances, the destination of the data unit 600 may be a particular consumer 410 (e.g., a particular VNF 150 or component(s) of ONAP 145). Source field 610 stores a unique identifier (ID), label or name, ONAP component ID, or address of a node (e.g., VNF 150) that generated the data unit 600. Segment identifier (ID) field 615 stores a unique identifier, associated with a particular data bus segment 210 in the hierarchical data bus system 120, that maintains the destination topic identified, for example, in topic ID field 625. IBH ID field 620 stores a unique identifier, associated with a particular IBH 140 in the hierarchical data bus system 120, that may maintain the destination topic identified, for example, in topic ID field 625. Topic ID field 625 stores a unique identifier, associated with a particular topic maintained at a data bus 130 associated with the data bus segment 210 identified in field 615 or maintained at an IBH 140 identified in field 620. The particular data bus segment 210 identified in field 615, and/or the particular IBH 140 identified in field 620, may each maintain multiple different topics, with each different topic having a different topic ID within field 625. In some implementations, each different topic maintained at the IBH 140 identified in field 620, or at the data bus segment 210 identified in field 615, may collect/store a different type of data. If the topic identified in field 625 is maintained only at a data bus segment 210, then field 615 may store a unique identifier associated with the data bus segment 210, and field 620 may not store a value (or may store a null value). If the topic identified in field 625 is maintained only at an IBH 140, then field 620 may store a unique identified associated with the IBH 140, and field 615 may not store a value (or may store a null value). If a particular topic is maintained at both a data bus segment 210 and an IBH 140, then field 615 may store a unique identifier associated with the particular data bus segment, and field 620 may store a unique identifier associated with the particular IBH 140.

Event/data priority level field 630 stores a priority level associated with the payload data in field 655. The priority level identified in field 630 may indicate a priority level (e.g., high or low) associated with the data itself, or with an event that the payload data describes.

Consumer/producer priority level field 635 stores a priority level associated with the producer that is the source of data unit 600 or a priority level associated with the consumer(s) that is/are the target of data unit 600. In some circumstances, data units 600 generated by a particular producer are given higher or lower priority than data units 600 generated by other producers. In other circumstances, data units 600 targeted for certain consumers are given higher or lower priority than data units 600 targeted for other consumers. In the case of a read request message type (as described with respect to field 640 below), a high consumer priority level identified in field 635 enables the consumer, identified in source field 610, to read data from the topic identified in field 625 at a higher priority before other consumers having a lesser consumer priority level. Thus, a high priority consumer reads data from a topic before other consumers having less than a high priority designation. In the case of a write request message type (as described with respect to field 640 below), a high producer priority level identified in field 635 enables the producer, identified in source field 610, to write data to a topic identified in field 625 at a higher priority before other producers having a lesser producer priority level. Thus, a high priority producer writes data to a topic before other producers having less than a high priority designation.

Data/message type field 640 stores data indicating a type of data or a type of message included in the data unit 600. The various data/message types may include, for example, a read request message, a write request message, configuration data, error data, status data, or log data. Other data types or message types, however, may be stored in field 640. Time stamp field 645 stores data that indicates a time, such as a date and time in hours:minutes:seconds format, when the data unit 600 was created. Time to live field 650 stores data that indicates a length of time during which the data unit 600, and its contents, will be valid. For example, the data stored in field 650 may indicate a time in seconds, minutes, hours, or days.

Payload data field(s) 655 stores one or more fields that contain the payload data of the data unit 600. The payload load data includes data, of a type identified in field 640, that the source, identified in field 610, is sending or has sent to a destination identified in field 605.

Figure 7:
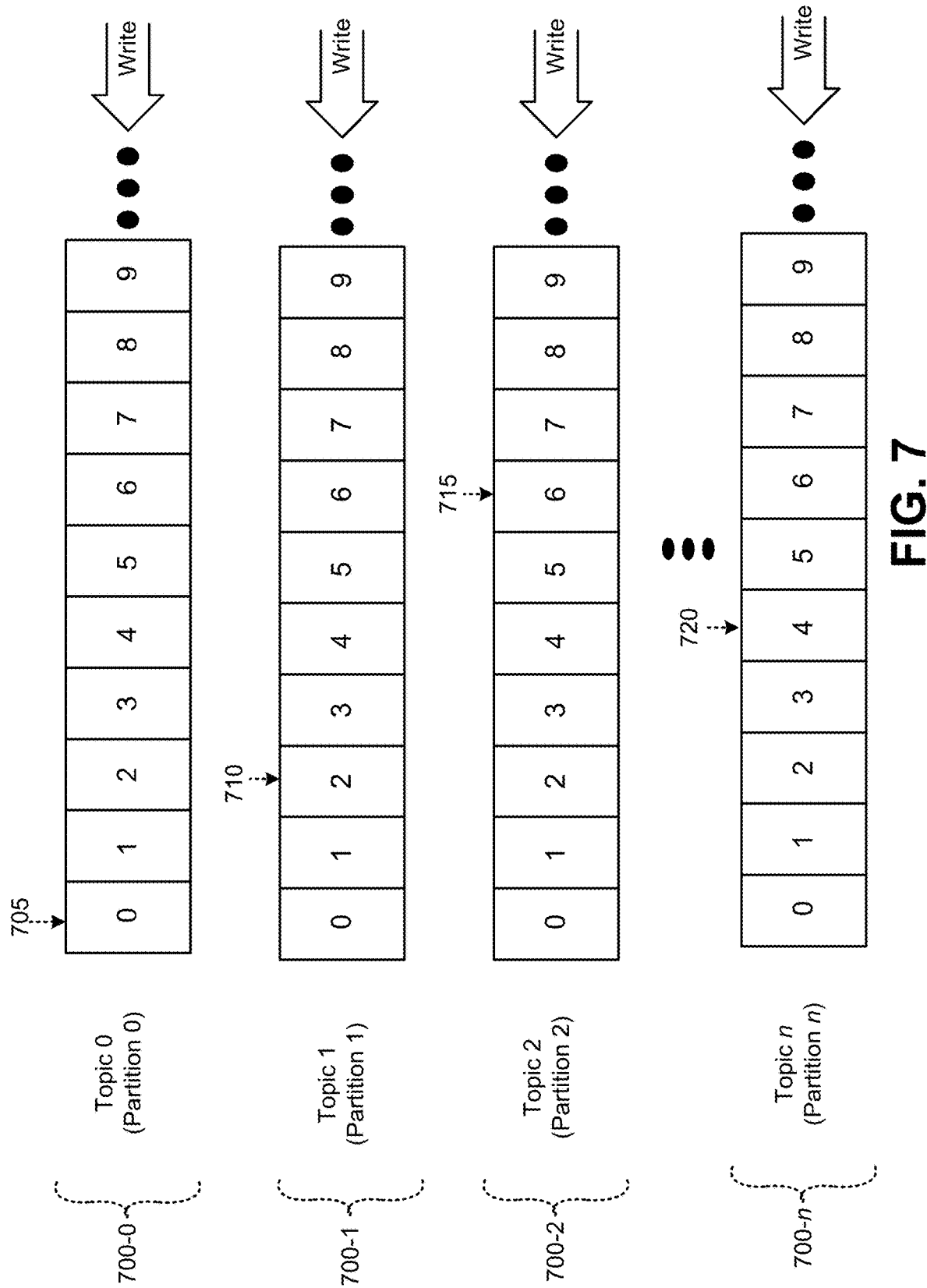
FIG. 7 depicts the contribution of data to a data bus or inter-bus hub via one or more partitions of a partitioned log for consumption by one or more consumers.

FIG. 7 depicts the contribution of data to a data bus 130 or IBH 140, according to one exemplary implementation, via one or more partitions of a partitioned log for consumption by one or more consumers. In the implementation shown, data bus 130 or IBH 140 may include a partitioned log that includes multiple partitions, with each partition being associated with a different topic/category. In the implementation shown, data bus 130 or IBH 140 includes n partitions, including a partition 0 700-0, a partition 1 700-1, a partition 2 700-2, and a partition n 700-$n$, where n is greater than or equal to one. The partitioned log of data bus 130 or IBH 140 may include any number of partitions. Each partition of the partitioned log includes an ordered sequence of records to which each new record is appended as data is published to the partition (shown as a "write" operation at the right side of each partition 700 in FIG. 7). Each record in the partition may be assigned a sequential identification number, called an offset, that uniquely identifies each record within the partition. For example, in FIG. 7, offset 0 in partition 700-0 is indicated at 705, offset 2 into partition 700-1 is indicated at 710, offset 6 into partition 700-2 is indicated at 715, and offset 4 into partition 700-3 is indicated at 720. Each record in each partition 700 of the data bus 110 or IBH 140 may store a block of data that is specific to the topic, or category, associated with that partition 700. Data bus 130 or IBH 140 durably persists records published to a partition of the partitioned log, whether or not the records have been consumed by the appropriate consumer (i.e., a single record may be consumed by more than one consumer), using a configurable retention period. Each record of a partition (e.g., topic) is available for consumption during the duration of the configurable retention period for that record.

Figure 8:
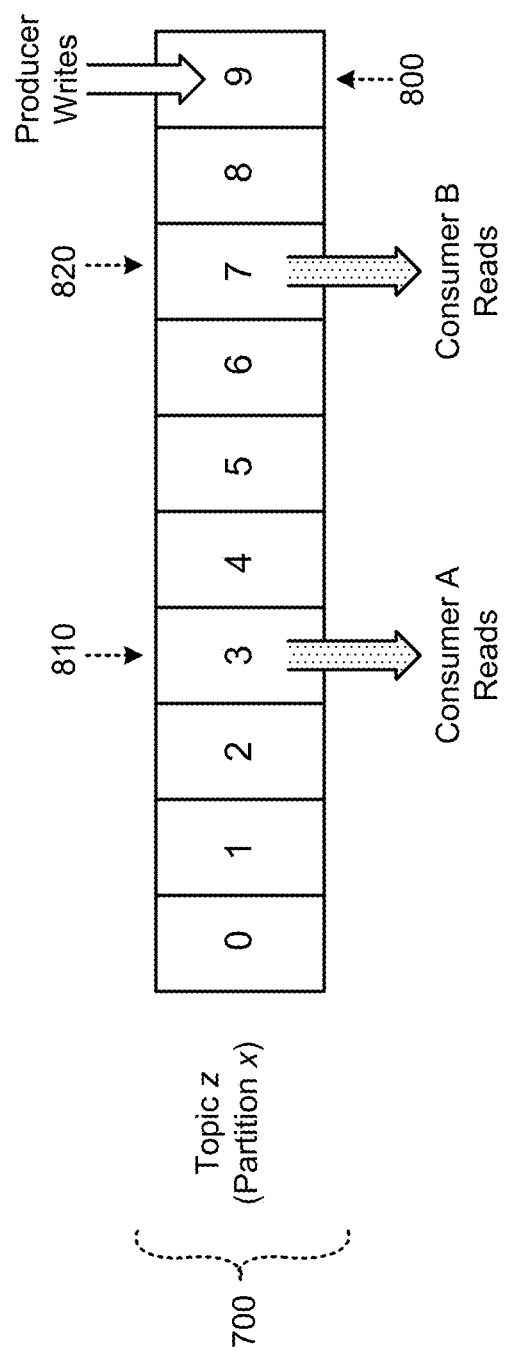
FIG. 8 illustrates examples of records being written to, and read and consumed from, a generic partition x of a data bus or inter-bus hub that is associated with a generic topic z.

FIG. 8 illustrates examples of records being contributed to (i.e., written to), and read and consumed from, a generic partition x of data bus 130 or IBH 140 that is associated with a generic topic z. As shown, a producer/contributor (not shown) sends data to data bus 130 or IBH 140 for storing and, upon receipt, data bus 130 or IBH 140 appends a new record 800, containing the published data, to the sequence of existing records of partition 700 of the partitioned log of data bus 130 or IBH 140. Consumer A may then retrieve and consume a record from data bus 130 or IBH 140 by, as depicted in FIG. 8, reading record "3" 810 from partition 700. Additionally, as shown, Consumer B may also retrieve and consume a record from data bus 130 or IBH 140 by reading record "7" 820 from partition 700. In some circumstances, consumer A and consumer B may be different entities, but in other circumstances consumer A and consumer B may be a same entity (e.g., a same VNF 150).

Figure 9:
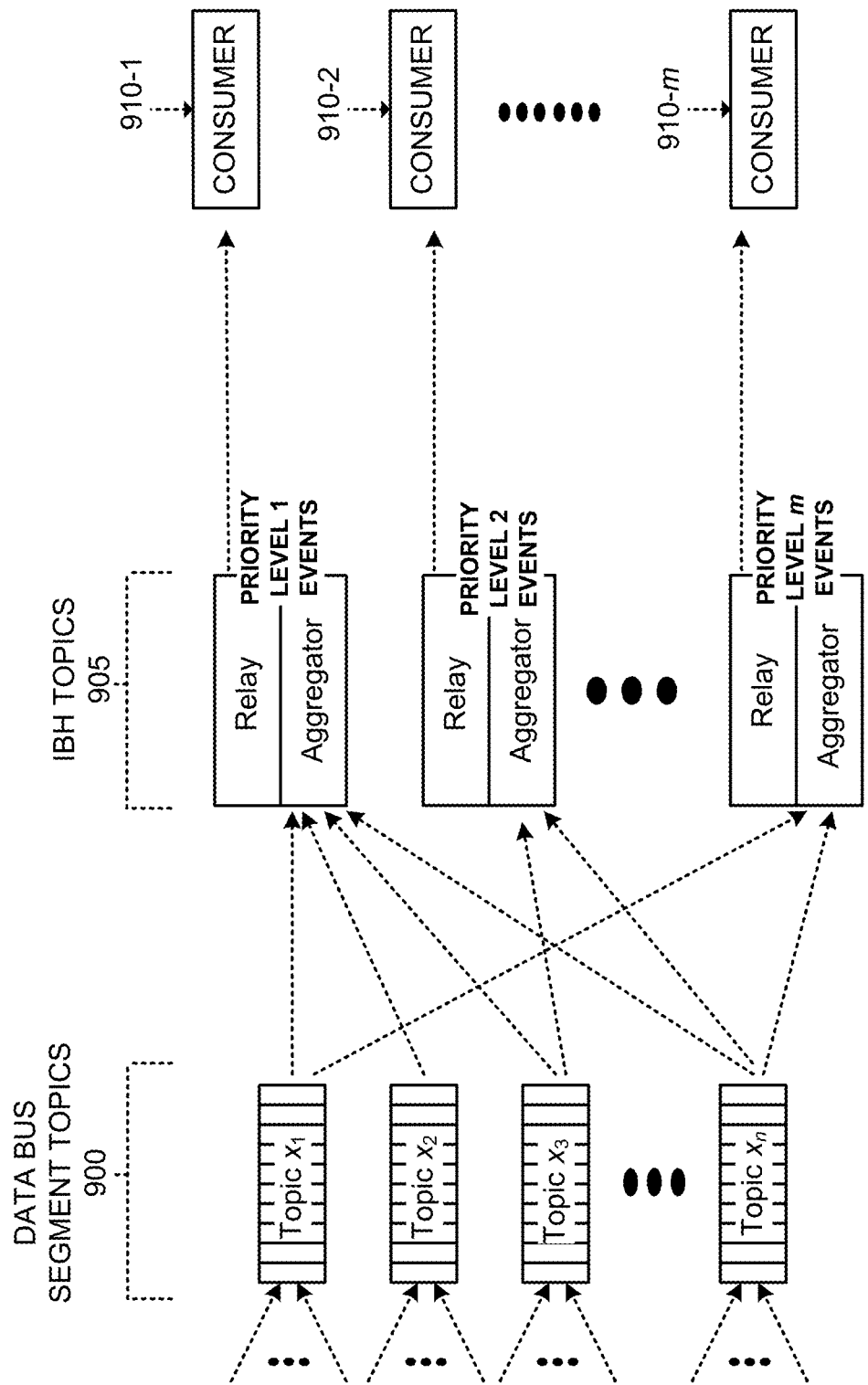
FIGS. 9 and 10 depict examples of the use of a hierarchical data bus system for aggregating records in topics at an inter-bus hub from topics stored in lower level data buses for providing the aggregated records to consumers.
Figure 10:
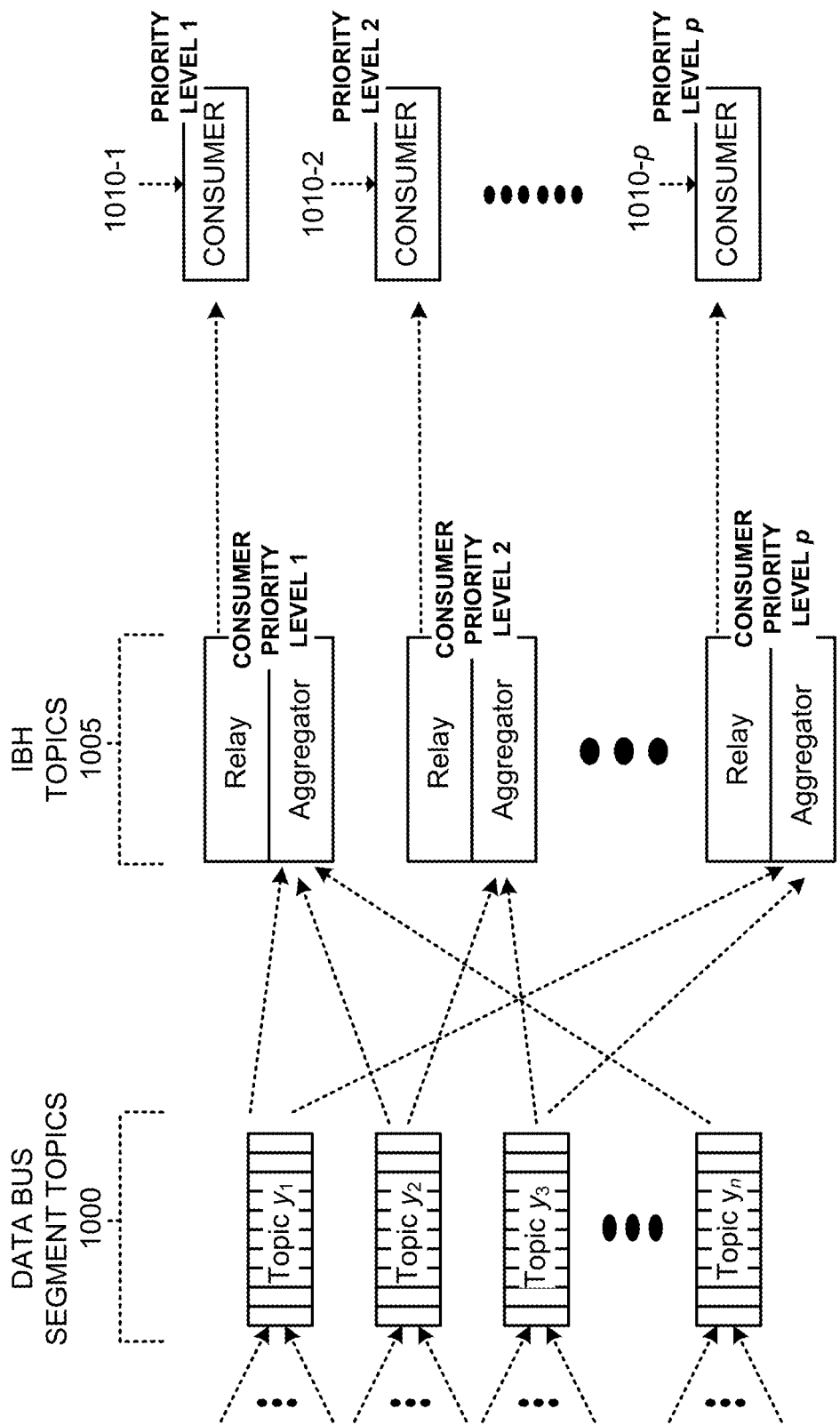

FIGS. 9 and 10 depict examples of the use of hierarchical data bus system 120 for aggregating records in topics at an IBH 140 from topics stored in lower level data buses 130 for providing the aggregated records to consumers. "Aggregating," as referred to herein, includes collecting or gathering particular data into one or more topics. The collecting or gathering of the particular data may include, for example, collecting and passing particular data to a specified destination, collecting and averaging particular data, identifying and collecting specific records based on embedded information, and/or collecting particular data and creating corresponding summary data based on pre-defined criteria or based on a pre-defined algorithm. As shown in FIG. 9, multiple data bus segment topics 900 (topic $x_1$, topic $x_2$, topic $x_3$, topic $x_n$) store records received from one or more producers (not shown). IBH 140, based on a configured filter, retrieves and aggregates the data of records from particular ones of the data bus segment topics 900. The configured filter may include rules that specify particular data bus segment topics 900 from which records are to be aggregated. The configured filter may alternatively, or additionally, include rules that specify particular records from topics 900 that are to be aggregated. For example, the configured filter may include rules that specify that all records containing data of a certain type may be aggregated from data bus segment topics 900 into a single topic of IBH topics 905 at IBH 140. As another example, the configured filter may include rules that specify that all records associated with a certain destination may be aggregated from data bus segment topics 900 into a single topic of IBH topics 905 at IBH 140. In some circumstances, IBH 140 may read all records from particular ones of data bus segment topics 900 that match the configured filter and may aggregate those records in a particular topic of IBH topics 905 at IBH 140. In other circumstances, IBH 140 may read only those records from selected ones of data bus segment topics 900 that have a particular data priority level (and possibly which also match the configured filter) and may aggregate those records in a particular topic of IBH topics 905 at IBH 140. In further circumstances, IBH 140 may read only those records from selected ones of data bus segment topics 900 having sources and/or destinations that match particular producer and/or consumer priority levels. For example, a first consumer may have a priority level of 1, a second consumer may have a lower priority level of 2, and a third consumer may have an even lower priority level of 3.

Referring to the example of FIG. 9, records stored at topics $x_1$, $x_2$, x3 and $x_n$ of data bus segment topics 900, having a data priority level of 1 (the highest priority level), may be aggregated at a particular topic of IBH topics 905 of an IBH 140. Further, as shown in FIG. 9, records stored at topics $x_3$ and $x_n$ of data bus segment topics 900, having a data priority level of 2, may be aggregated at a particular topic of IBH topics 905 of IBH 140. Additionally, as shown in FIG. 9, records stored at topics $x_1$ and $x_n$ of data bus segment topics 900, having a data priority level of m (where m may be greater than or equal to three), may be aggregated at a particular topic of IBH topics 905 of IBH 140. A consumer 910-1 may read the aggregated priority level 1 records from the priority level 1 IBH topic 905, a consumer 910-2 may read the aggregated priority level 2 records from the priority level 2 IBH topic 905, and a consumer 910-$m$ may read the aggregated priority level m records from the priority level m IBH topic 905.

FIG. 10 depicts another example in which consumer and/or producer priority levels associated with records stored at a data bus segment topic are used to identify records for aggregating at a higher level IBH topic. As shown, records stored at topics $y_1$, $y_2$, and $y_n$ of data bus segment topics 1000, having a consumer priority level of 1 (the highest priority level), may be aggregated at a particular topic of IBH topics 1005 of an IBH 140. Further, as shown in FIG. 10, records stored at topics $y_2$ and $y_3$ of data bus segment topics 1000, having a consumer priority level of 2, may be aggregated at a particular topic of IBH topics 1005 of IBH 140. Additionally, as shown in FIG. 10, records stored at topics $y_1$ and $y_3$ of data bus segment topics 1000, having a data priority level of p (where p may be greater than or equal to three), may be aggregated at a particular topic of IBH topics 1005 of IBH 140. A consumer 1010-1 associated with a consumer priority level of 1 may read the aggregated priority level 1 records from the consumer priority level 1 IBH topic 1005, a consumer 1010-2 associated with a consumer priority level of 2 may read the aggregated priority level 2 records from the consumer priority level 2 IBH topic 1005, and a consumer 1010-$p$ associated with a consumer priority level of p may read the aggregated priority level p records from the consumer priority level 2 IBH topic 1005. Though a priority level associated with consumers are depicted in FIG. 10, priority levels of producers may alternatively, or additionally, be used for aggregating records from data bus segment topics to a higher level IBH topic(s). For example, data produced by a particular producer that is associated with a high priority level may be aggregated at a high priority IBH topic at a higher level IBH 140 whereas data produced by another producer that is associated with a low priority level may be aggregated at a low priority IBH topic at the higher level IBH 140.

Figure 11:
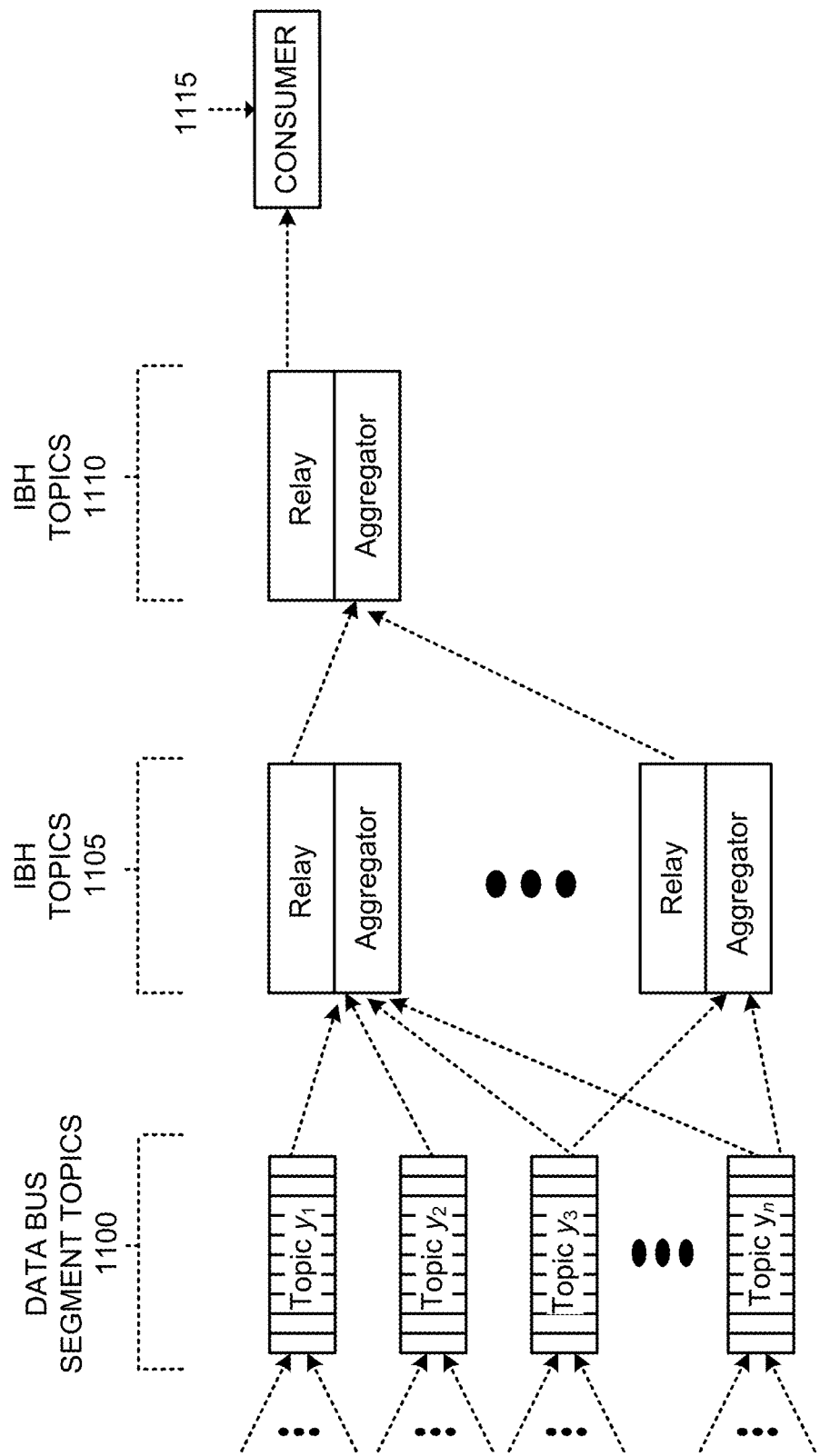
FIG. 11 depicts another example of the use of a hierarchical data bus system for aggregating records from topics at a data bus to inter-bus hubs at multiple higher levels within the hierarchical data bus system.

FIG. 11 depicts another example of the use of hierarchical data bus system 120 for aggregating records from topics at a data bus 130 to IBHs 140 at multiple higher levels within the hierarchical data bus system 120. In the example shown in FIG. 11, records from topics at a data bus 130 are aggregated at IBH topics at two higher hierarchical levels before provision to a destination consumer.

As shown, multiple data bus segment topics 1100 (topic $y_1$, topic $y_2$, topic $y_3$, topic $y_n$) store records received from one or more producers (not shown). A lower level IBH 140, based on a configured filter, retrieves and aggregates the data of records from particular ones of the data bus segment topics 1100. The configured filter may include rules that specify particular data bus segment topics 1100 from which records are to be aggregated. The configured filter may alternatively, or additionally, include rules that specify particular records from topics 1100 that are to be aggregated. For example, the configured filter may include rules that specify that all records containing data of a certain type may be aggregated from data bus segment topics 1100 into a single topic of IBH topics 1105 at the lower level IBH 140. As another example, the configured filter may include rules that specify that all records associated with a certain destination may be aggregated from data bus segment topics 1100 into a single topic of IBH topics 1105 at the lower level IBH 140. In some circumstances, the lower level IBH 140 may read all records from particular ones of data bus segment topics 1100 that match the configured filter and may aggregate those records in a particular topic of IBH topics 1105 at the lower level IBH 140. In other circumstances, the lower level IBH 140 may read only those records from selected ones of data bus segment topics 1100 that have a particular data priority level (and possibly which also match the configured filter) and may aggregate those records in a particular topic of IBH topics 1105 at the lower level IBH 140. In further circumstances, the lower level IBH 140 may read only those records from selected ones of data bus segment topics 1100 having sources and/or destinations that match particular producer and/or consumer priority levels. For example, a first consumer may have a priority level of 1, a second consumer may have a lower priority level of 2, and a third consumer may have an even lower priority level of 3.

A higher level IBH 140, based on a configured filter, retrieves and aggregates the data of records from particular ones of the IBH topics 1105 stored at the lower level IBH 140. The configured filter may include rules that specify particular IBH topics 1105 from which records are to be aggregated. The configured filter may alternatively, or additionally, include rules that specify particular records from IBH topics 1105 that are to be aggregated. For example, the configured filter may include rules that specify that all records containing data of a certain type may be aggregated from IBH topics 1105 into a single topic of IBH topics 1110 at the higher level IBH 140. As another example, the configured filter may include rules that specify that all records associated with a certain destination may be aggregated from IBH topics 1105 into a single topic of IBH topics 1110 at the higher level IBH 140. In some circumstances, the higher level IBH 140 may read all records from particular ones of IBH topics 1105 that match the configured filter and may aggregate those records in a particular topic of IBH topics 1110 at the higher level IBH 140. In other circumstances, the higher level IBH 140 may read only those records from selected ones of IBH topics 1105 that have a particular data priority level (and possibly which also match the configured filter) and may aggregate those records in a particular topic of IBH topics 1110 at the higher level IBH 140. In further circumstances, the higher level IBH 140 may read only those records from selected ones of IBH topics 1105 at the lower level IBH 140 having sources and/or destinations that match particular producer and/or consumer priority levels. For example, a first consumer may have a priority level of 1, a second consumer may have a lower priority level of 2, and a third consumer may have an even lower priority level of 3.

Figure 12:
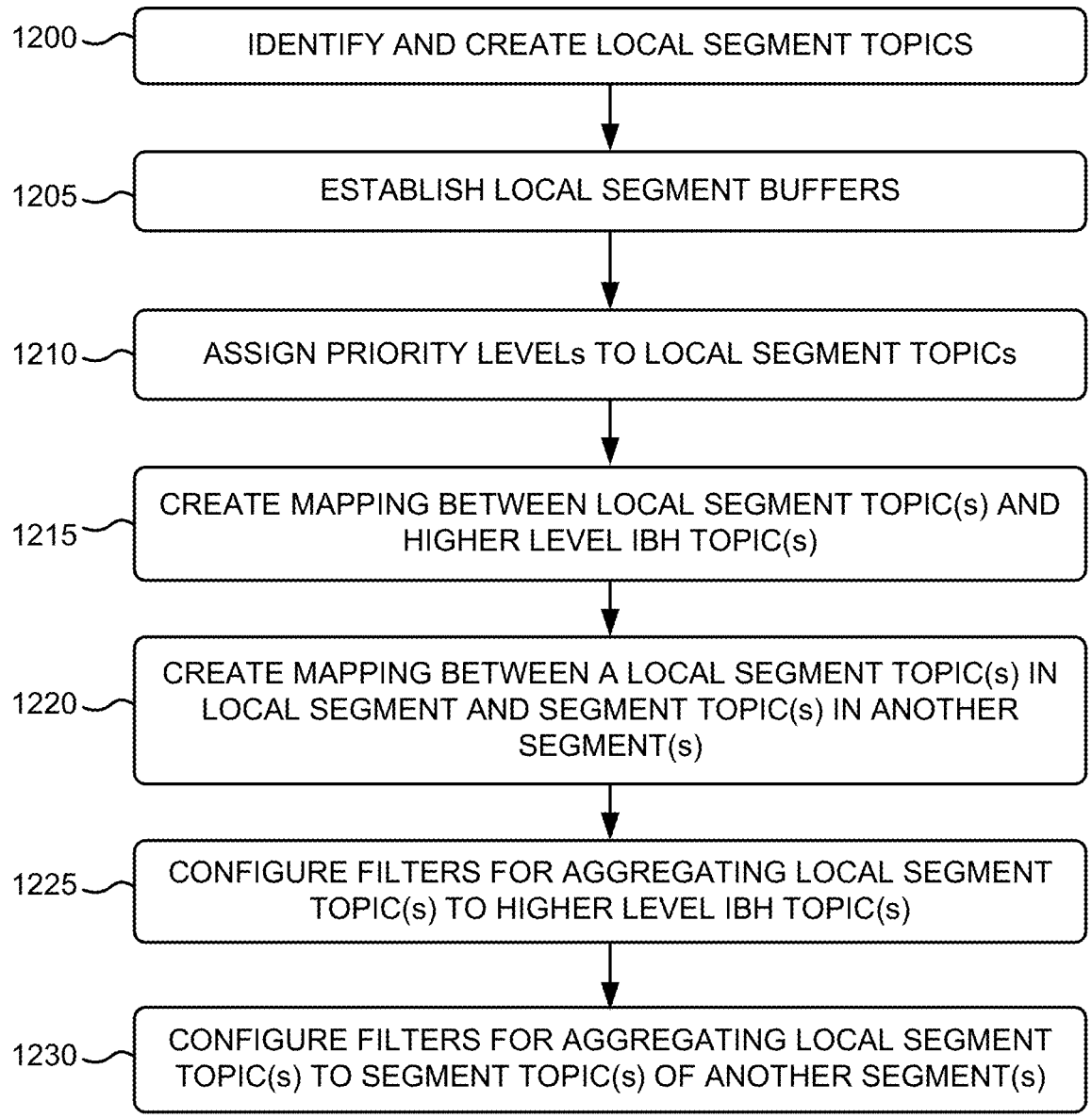
FIG. 12 illustrates an exemplary process for configuring a local segment data bus of FIGS. 1-4.

FIG. 12 illustrates an exemplary process for configuring a local segment data bus 130. The exemplary process of FIG. 12 may be implemented, for example, by configuration server 125 in conjunction with a particular data bus(es) 130 being configured or re-configured for operation within hierarchical data bus system 120. The exemplary process of FIG. 12 may be executed for initially configuring a data bus 130, or for re-configuring a previously configured data bus 130, within hierarchical data bus system 120.

The exemplary process includes configuration server 125 identifying and creating local segment topics (block 1200). For example, an administrator may interact with a user interface associated with configuration server 125 to generate instructions and parameters for creating one or more local segment topics at a data bus 130, and for assigning unique segment topic identifiers to each created local segment topic. Creation of the local segment topics may include proper allocation of storage to each topic, where the partition size may include the maximum number of records that may be stored in memory for each topic. Referring to FIG. 7, for example, configuration server 125 may identify and create topic 0 700-0, topic 1 700-1, topic 2 700-2, and topic n 700-n at a data bus 130 and may send instructions and parameters to the data bus 130 for establishing the partitions in memory associated with the identified and created topics.

Configuration server 125 establishes local segment buffers (block 1205). Configuration server 125 defines one or more local segment buffers at the data bus 130, and a corresponding size for each of the defined local segment buffers. The local segment buffers may include input buffers for receiving and temporarily storing input data units and/or output buffers for temporarily storing output data units or records.

Configuration server 125 assigns priority levels to local segment topics at data bus 130 (block 1210). For example, an administrator may interact with a user interface associated with configuration server 125 to assign a particular priority level(s) to one or more of the topics created in block 1200. The priority level(s) may include an event or data priority level that indicates a level of importance or criticality associated with data to be stored in the respective topic. The priority level(s) may additionally, or alternatively, include a consumer or producer priority level that indicates a level of priority associated with the consumers or producers that may store records in the respective topic. For example, a topic z may store records from producers having a high priority whereas topic x may store records from producers having a low priority. As another example, topic p may store records destined for consumers having a high priority whereas topic q may store records destined for consumers having a low priority. In some circumstances, a given topic may have both a event/data priority level and a consumer/producer priority level assigned to it.

Configuration server 125 creates a mapping between local segment topics and higher level IBH topic(s) (block 1215). In one implementation, an administrator may interact with a user interface associated with configuration server 125 to map one or more particular local segment topics to at least one higher level IBH topic. In one example, local segment topics t_loc_1, and t_loc_2 at a data bus 130 may be mapped to higher level IBH topic IBH_t_1 at an IBH 140, and local segment topic t_loc_3 may be mapped to higher level IBH topic IBH_t_2 at IBH 140. Any number of local segment topics may be mapped to one or more particular higher level IBH topics.

Configuration server 125 creates a mapping between a local segment topic(s) in the local segment and a segment topic(s) in another segment(s) (block 1220). In one implementation, an administrator may interact with a user interface associated with configuration server 125 to map one or more particular local segment topics at a first data bus 130 to at least one segment topic at another data bus 130. In one example, local segment topics t_loc_1, and t_loc_2 at a first data bus 130 may be mapped to a local segment topic t_loc_3 at a second data bus 130, and local segment topic t_loc_4 at the first bus 130 may be mapped to a local segment topic t_loc_5 at a third data bus 130. Any number of local segment topics at a data bus 130 may be mapped to one or more particular local segment topics at another data bus 130.

Configuration server 125 configures filters for aggregating local segment topic(s) to a higher level IBH topic(s) (block 1225). In one implementation, an administrator may interact with a user interface associated with configuration server 125 to generate a set of rules for filtering the records of one or more particular local segment topics that are to be aggregated and stored in records of a higher level IBH topic. The rules may identify destinations, sources, segment IDs, IBH IDs, topic IDs, event/data priority levels, consumer/producer priority levels, data types, time stamps, and/or matching data content in payload data that cause the corresponding records to be aggregated and stored in the records of a particular higher level IBH topic. As one example, a set of rules generated for aggregating local segment topics to a higher level IBH topic may specify a particular data type that causes records in the topics stored at the data bus 130, having a matching data type, to be retrieved and stored at a IBH topic at a higher level IBH.

Configuration server 125 configures filters for aggregating a local segment topic(s) to segment topic(s) of another segment(s) (block 1230). In one implementation, an administrator may interact with a user interface associated with configuration server 125 to generate a set of rules for filtering the records of one or more particular local segment topics that are to be aggregated and stored in records of a topic(s) of another segment(s). The rules may identify destinations, sources, segment IDs, IBH IDs, topic IDs, event/data priority levels, consumer/producer priority levels, data types, time stamps, and/or matching data content in payload data that cause the corresponding records to be aggregated and stored in the records of a particular topic(s)

of another segment(s). As one example, a set of rules generated for aggregating local segment topics to a topic of another segment may specify a particular data type that causes records in the topics stored at the data bus 130, having a matching data type, to be retrieved and stored at a particular topic at another data bus 130 in another segment.

The exemplary process of FIG. 12 may be repeated for initially configuring, or re-configuring, each segment data bus 130 within hierarchical data bus system 120. When re-configuring a segment data bus 130, selected blocks of FIG. 12 may be repeated, instead of repeating the entire process shown in FIG. 12. As one example, assigning the priority level(s) to each local segment topic, in block 1210, may be repeated without repeating any of the other blocks of FIG. 12 (e.g., blocks 1200 and 1205). The exemplary process of FIG. 12, when executed for each data bus 130 in the hierarchical data bus system 120, establishes the local segment topics and the local segment buffers, assigns priority levels to the established local segment topics, establishes mappings between local segment topics and higher level IBH topics and between local segment topics and topics of another segment(s), and generates sets of rules for filtering the content of records in local segment topics for aggregating particular ones of the records for storing in higher level IBH topics or in topics of another segment(s).

Figure 13A:
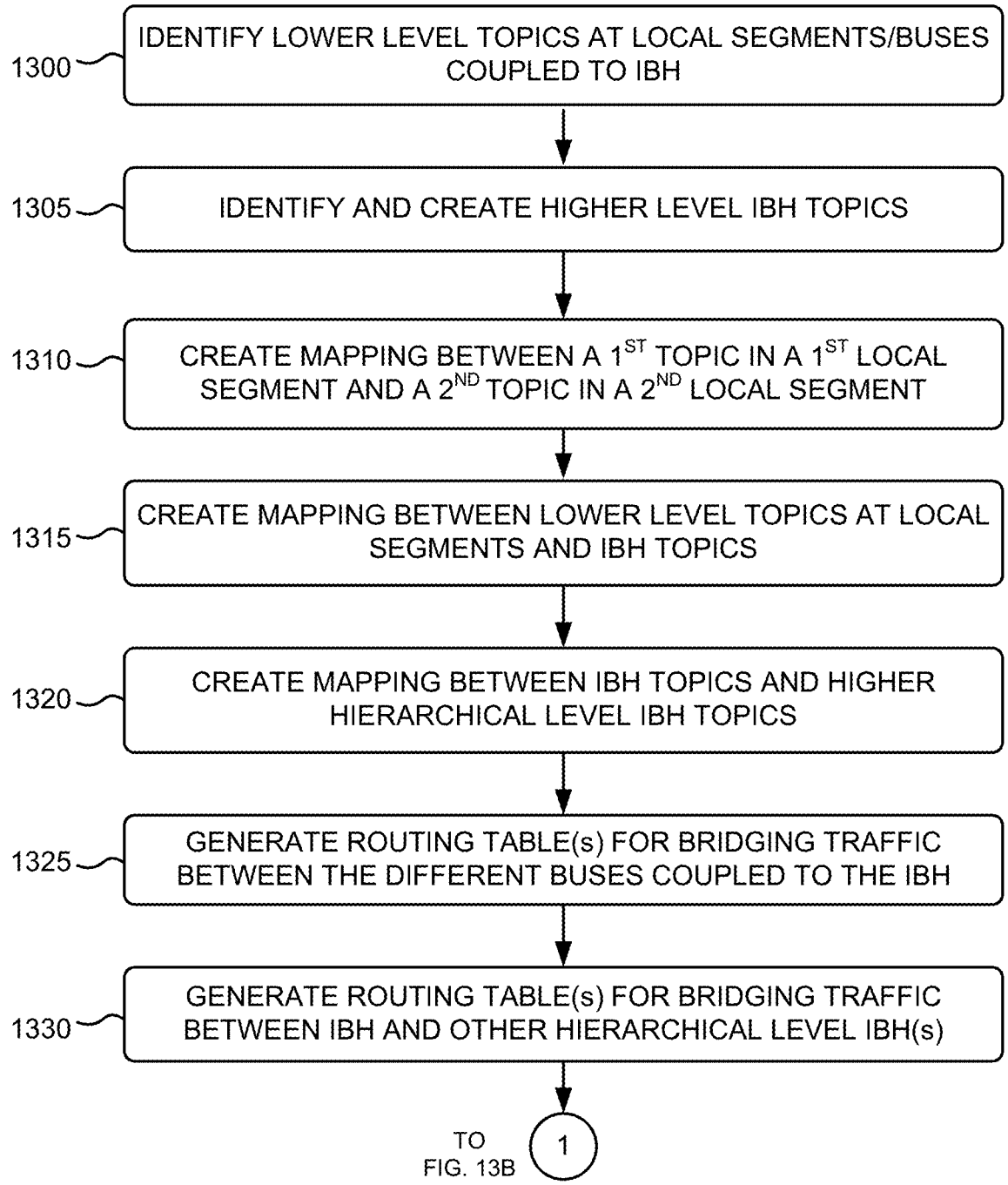
FIGS. 13A and 13B illustrate an exemplary process for configuring an inter-bus hub.
Figure 13B:
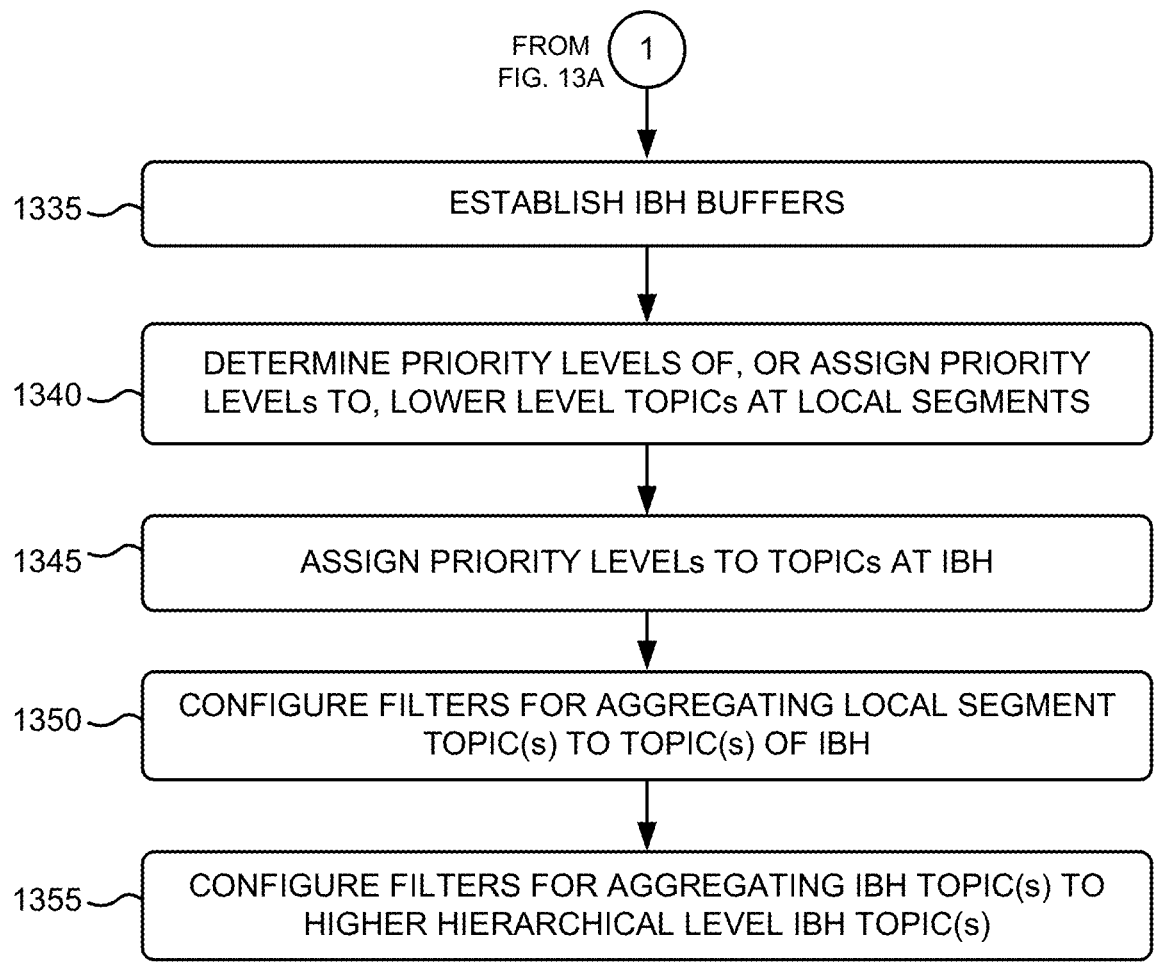

FIGS. 13A and 13B illustrate an exemplary process for configuring an IBH 140. The exemplary process of FIGS. 13A and 13B may be implemented, for example, by configuration server 125 in conjunction with a particular IBH 140 being configured or re-configured for operation within hierarchical data bus system 120. The exemplary process of FIGS. 13A and 13B may be executed for initially configuring an IBH 140, or for re-configuring a previously configured IBH 140, within hierarchical data bus system 120.

The exemplary process includes configuration server 125 identifying lower level topics at local segments 210/buses 130 that are coupled to the IBH 140 (block 1300). For example, an administrator may interact with a user interface associated with configuration server 125 to identify local segments 210, and their respective data buses 130, that are connected directly to a particular IBH 140. Referring to the example of FIG. 2, an administrator may identify the segments 210 that are connected directly to a lower level IBH 140-$L_1$. Once these local segments 210 are identified as being connected to the particular IBH 140-$L_1$, all of the topics already established (e.g., in block 1200 of FIG. 12) in each of the local segments' data buses 130 are identified.

Configuration server 125 identifies and creates higher level IBH topics (block 1305). In one implementation, an administrator may interact with a user interface associated with configuration server 125 to generate instructions and parameters for creating one or more topics at an IBH 140, and for assigning unique topic identifiers to each created IBH topic. Creation of the IBH topics may include proper allocation of storage to each topic, where the partition size may include the maximum number of records that may be stored in memory for each topic. Referring again to FIG. 7, configuration server 125 may identify and create topic 0 700-0, topic 1 700-1, topic 2 700-2, and topic n 700-$n$ at an IBH 140 and may send instructions and parameters to the IBH 140 for establishing the partitions in memory associated with the identified and created topics.

Configuration server 125 creates a mapping between a first topic in a first local segment and a second topic in a second local segment (block 1310). Configuration server 125 may retrieve the local segment topic mapping(s), created in block 1220 of FIG. 12, for each local segment data bus 130. Based on the previously created local segment topic mappings, configuration server 125 creates a mapping between a first topic stored at a first data bus 130 connected to the IBH 140 and a second topic stored at a second data bus 130 connected to the IBH 140. Configuration server 125, therefore, creates multiple mappings between topics stored at a data bus 130 connected to the IBH 140 and topics stored at another data bus 130 connected to the IBH 140 based on the local segment topic mappings created in block 1220 of FIG. 12. Configuration server 125 may send the created local segment topic mappings for installation at the IBH 140. In one example, local segment topics t_loc_1, t_loc_2, and t_loc_3 at a first data bus 130 may be mapped to a segment topic t_loc_4 at a second data bus 130, and local segment topic t_loc_5 at a third bus 130 may be mapped to a segment topic t_loc_6 at a fourth data bus 130. Any number of local segment topics at data buses 130 connected to the IBH 140 may be mapped to one or more particular local segment topics at another data bus 130.

Configuration server 125 creates a mapping between lower level topics at the local segments and IBH topics at the IBH 140 (block 1315). Configuration server 125 may retrieve the local segment topic/higher level IBH topic mapping(s) created in block 1215 of FIG. 12 for each data bus 130 in a local segment 210. Based on the previously created local segment topic/higher level IBH topic mappings, configuration server 125 creates a mapping between a one or more local segment topics at a first data bus 130 connected to the IBH 140 and a topic(s) at the IBH 140. Configuration server 125 may, therefore, create multiple mappings between topics stored at data buses 130 in local segments connected to the IBH 140 and topics stored at IBH 140 based on the topic mappings created in block 1215 of FIG. 12. Configuration server 125 may send the created local segment topic/higher level IBH topic mappings for installation at the IBH 140. In one example, local segment topics t_loc_1, t_loc_2, and t_loc_3 at a first data bus 130 may be mapped to an IBH topic top_4 at IBH 140, and local segment topic t_loc_4 at a second data bus 130 may be mapped to an IBH topic top_5 at IBH 140. Any number of local segment topics at data buses 130 connected to the IBH 140 may be mapped to one or more particular IBH topics at IBH 140.

Configuration server 125 creates a mapping between IBH topics and higher hierarchical level IBH topics (block 1320). In one implementation, an administrator may interact with a user interface associated with configuration server 125 to map one or more IBH topics to at least one higher level IBH topic. In one example, IBH topics t_IBH$_{low\_}$1, and t_IBH$_{low\_}$2 at an IBH 140 may be mapped to higher level IBH topic t_IBH$_{high\_}$1 at a higher hierarchical level IBH 140, and IBH topic t_IBH$_{low\_}$3 may be mapped to higher level IBH topic t_IBH$_{high\_}$2 at the higher hierarchical level IBH 140. Any number of IBH topics may be mapped to one or more particular higher level IBH topics. Configuration server 125 may send the created IBH topic mappings for installation at the lower level IBH 140.

Configuration server 125 generates a routing table(s) for bridging traffic between the different data buses 130 coupled to the IBH 140 (block 1325). Configuration server 125 determines a network topography of hierarchical data bus system 120 that includes the IBH 140, any higher level IBH 140 connected to the IBH 140, and the data buses 130 of the local segments that are connected to the IBH 140. Configuration server 125 determines forwarding paths, within hierarchical data bus system 120, for forwarding traffic received from data buses 130 in each local segment connected to IBH 140 to each other data bus 130 in another local segment connected to IBH 140. Based on the determined forwarding paths, configuration server 125 generates a routing table(s) and installs the routing table(s) at the IBH 140 to enable the IBH 140 to bridge traffic between the different data buses 130 connected to the IBH 140.

Configuration server 125 generates a routing table(s) for bridging traffic between the IBH 140 and other hierarchical level IBH(s) 140 (block 1330). Based on the network topography of hierarchical data bus system 120 determined in block 1325, configuration server 125 determines forwarding paths, within hierarchical data bus system 120, for forwarding traffic from the IBH 140 itself to every other higher and lower level IBH 140 connected to the IBH 140. Based on the determined forwarding paths, configuration server 125 generates a routing table(s) and installs the routing table(s) at the IBH 140 to enable the IBH 140 to bridge traffic between the IBH 140 and other connected higher and lower level IBHs 140.

Configuration server 125 establishes buffers at the IBH 140 (block 1335). Configuration server 125 defines one or more buffers at the IBH 140, and a corresponding size for each of the defined IBH buffers. The IBH buffers may include input buffers for receiving and temporarily storing input data units and/or output buffers for temporarily storing output data units or records. Configuration server 125 determines priority levels of, or assigns priority levels to, lower level topics at local segments (block 1340). Configuration server 125 may determine priority levels assigned to the topics of each data bus 130, of a segment(s) connected to the IBH 140, in block 1210 of FIG. 12. If priority levels have not yet been assigned to the topics of the data bus 130 of the segment, then configuration server 125 may assign priority levels to the local segment topics of the data bus 130. For example, an administrator may interact with a user interface associated with configuration server 125 to assign a particular priority level(s) to one or more of the topics at each data bus 130 connected to the IBH 140. The priority level(s) may include an event or data priority level that indicates a level of importance or criticality associated with data to be stored in the respective topic. The priority level(s) may additionally, or alternatively, include a consumer or producer priority level that indicates a level of priority associated with the consumers or producers that may store records in the respective topic. For example, a topic z may store records from producers having a high priority whereas topic x may store records from producers having a low priority. As another example, topic p may store records destined for consumers having a high priority whereas topic q may store records destined for consumers having a low priority. In some circumstances, a given topic may have both an event/data priority level and a consumer/producer priority level assigned to it.

Configuration server 125 assigns priority levels to topics at IBH 140 (block 1345). For example, an administrator may interact with a user interface associated with configuration server 125 to assign a particular priority level(s) to one or more of the IBH topics created in block 1305. As with the segment data bus 130 topics, the priority level(s) of the IBH topics may include an event or data priority level that indicates a level of importance or criticality associated with data to be stored in the respective topic. The priority level(s) may additionally, or alternatively, include a consumer or producer priority level that indicates a level of priority associated with the consumers or producers that may store records in the respective topic. For example, a topic z may store records from producers having a high priority whereas topic x may store records from producers having a low priority. As another example, topicp may store records destined for consumers having a high priority whereas topic q may store records destined for consumers having a low priority. In some circumstances, a given topic may have both an event/data priority level and a consumer/producer priority level assigned to it.

Configuration server 125 configures filters for aggregating local segment topic(s) to topic(s) of IBH 140 (block 1350). In one implementation, an administrator may interact with a user interface associated with configuration server 125 to generate a set of rules for filtering the records of one or more particular local segment topics that are to be retrieved and stored in records of an IBH topic(s). The rules may identify destinations, sources, segment IDs, IBH IDs, topic IDs, event/data priority levels, consumer/producer priority levels, data types, time stamps, and/or matching data content in payload data that cause the corresponding records to be aggregated and stored in the records of the IBH topic(s). As one example, a set of rules for aggregating local segment topics to the IBH topic may specify a particular data type that causes records in the topics stored at the connected local segment data bus(es) 130, having a matching data type, to be retrieved and stored at the IBH topic.

Configuration server 125 configures filters for aggregating IBH topic(s) to higher hierarchical level IBH topic(s) (block 1355). In one implementation, an administrator may interact with a user interface associated with configuration server 125 to generate a set of rules for filtering the records of one or more IBH topics maintained at the IBH 140 that are to be retrieved and stored in records of a higher level IBH topic(s). The rules may identify destinations, sources, segment IDs, IBH IDs, topic IDs, event/data priority levels, consumer/producer priority levels, data types, time stamps, and/or matching data content in payload data that cause the corresponding records to be retrieved from an IBH topic(s) and stored in the records of one or more higher level IBH topics. As one example, a set of rules for aggregating IBH topics to a higher level IBH topic may specify a particular data type that causes records in the IBH topic(s), having a matching data type, to be retrieved and stored at the higher level IBH topic(s). For example, referring to FIG. 3, records in an IBH topic maintained at IBH 140-$M_1$ containing data that matches a rule of the set of rules may be retrieved and then sent to IBH 140-H for storage in records of a higher level IBH topic at IBH 140-H.

The exemplary process of FIGS. 13A and 13B may be repeated for initially configuring, or re-configuring, each IBH 140 within hierarchical data bus system 120. When re-configuring an IBH 140, selected blocks of FIGS. 13A and 13B may be repeated, instead of repeating the entire process shown in FIGS. 13A and 13B. For example, the creating of the mappings between topics in blocks 1310, 1315, and/or 1320 may be selectively repeated, to create new mappings between hierarchical topics, without repeating any of the other blocks of FIGS. 13A and 13B.

Figure 14:
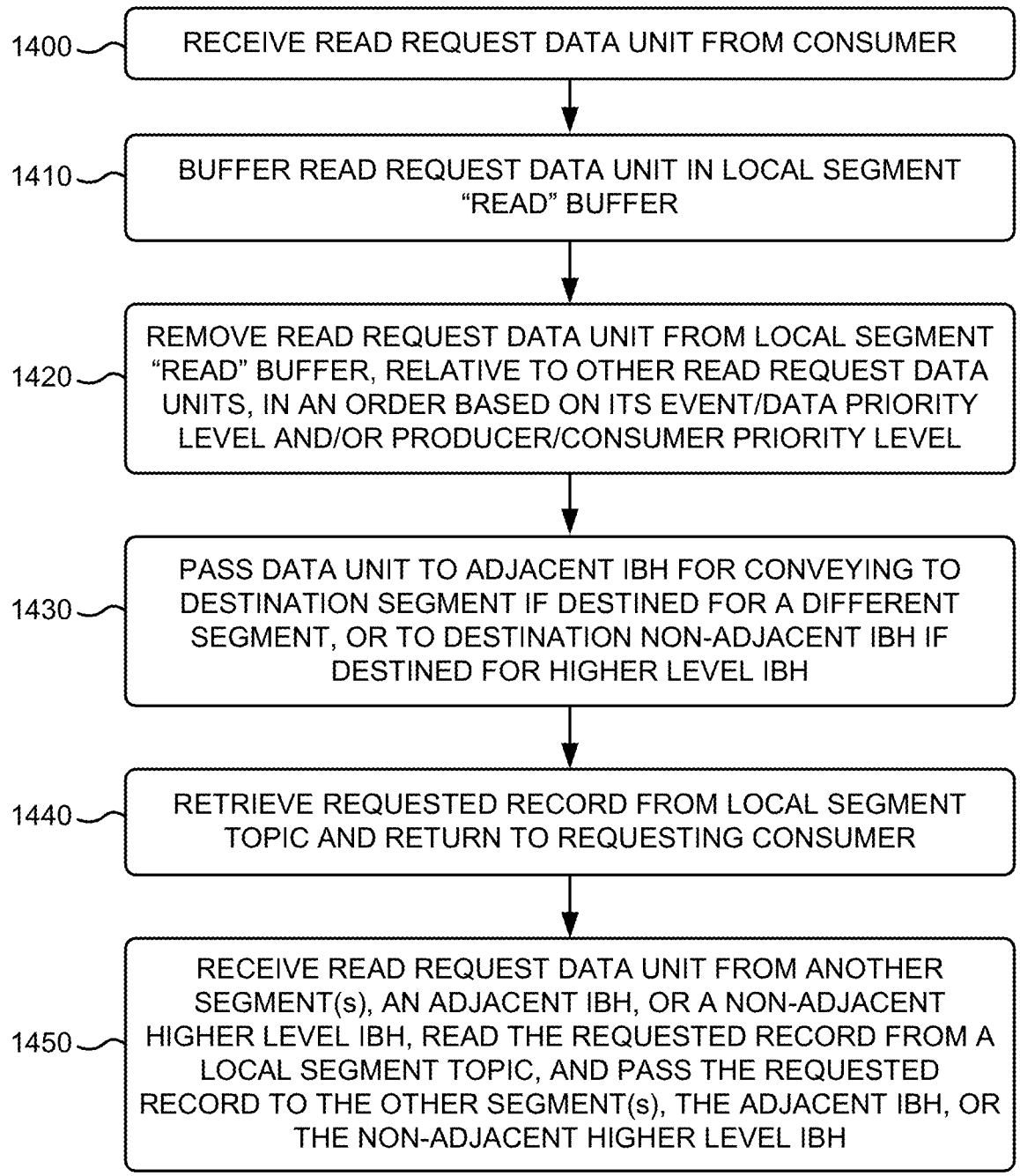
FIG. 14 illustrates an exemplary process for receiving, processing, and/or forwarding a consumer read request and retrieving a record corresponding to the read request at a local segment data bus.

FIG. 14 illustrates an exemplary process for receiving, processing, and/or forwarding a consumer read request and retrieving a record corresponding to the read request at a local segment data bus 130. The exemplary process of FIG. 14 may be implemented, for example, by a data bus 130 within a local data bus segment 200 of hierarchical data bus system 120.

The exemplary process includes a data bus 130 receiving a read request data unit from a consumer (block 1400). The consumer sending the read request data unit to the data bus 130 may include any network entity within network environment 100 including, for example, a component of ONAP 145 or a VNF 150. The read request data unit may include data in a format the same as, or similar to, the format of data unit 600 of FIG. 6.

The data bus 130 buffers the read request data unit in the local segment "read" buffer (block 1410). The data bus 130 stores the read request data unit in one of the locally maintained buffers (e.g., data queues) in memory (e.g., memory 530) that stores incoming read request data units. The "read" buffer may act as temporary storage for a stream of incoming read request data units that enables the data bus 130 to store, and selectively retrieve, the data units from the buffer based on certain criteria, such as a priority level of the event/data described in the data unit or based on a priority level of the consumer sending the read request data unit or a priority level of the producer that originated the record that is being requested to be read from a topic of the data bus 130. The data bus 130 removes the read request data unit from the local segment "read" buffer, relative to other read request data units, in an order based on an event/data priority level or a producer/consumer priority level of the data unit (block 1420). The data bus 130 may analyze the event/data priority level field 630 and/or consumer/producer priority level field 635 of the read request data unit 600 and selectively retrieve the read request data unit from the "read" buffer based on the priority level(s). For example, read request data units having a high priority level in event/data priority level field 630 may be retrieved from the "read" buffer before data units having a lower priority level. As another example, read request data units having a high consumer or producer priority level in field 635 may be retrieved from the "read" buffer before data units having a lower priority level.

The data bus 130 passes the retrieved data unit to an adjacent IBH for conveying to a destination segment 210 if the data unit is destined for a different segment 210, or conveying to a destination non-adjacent IBH 140 if destined for a higher level IBH 140 (block 1430). Referring to the example of FIG. 3, if a data bus 130 at segment 1, connected to IBH 140-$L_1$, retrieves a read request data unit from a "read" buffer, the data bus 130 may pass the read request data unit to IBH 140-$L_1$ for IBH 140-$L_1$ to convey to either the data bus 130 associated with segment $m_x$, or to the higher level IBH 140-$M_1$.

The data bus 130 retrieves the requested record from the local segment topic and returns the retrieved record to the requesting consumer in the local segment (block 1440). The data bus 130 analyzes the read request data unit retrieved from the "read" buffer and determines that the requested record is stored in a topic maintained at the data bus 130 itself. The data bus 130 identifies the topic storing the requested record, locates the requested record, and retrieves the record from the identified topic. The data bus 130 may then return the retrieved record to the requesting consumer.

The data bus 130 receives a read request data unit from another segment, an adjacent IBH 140, or a non-adjacent higher level IBH 140, reads the requested record from a local segment, and passes the requested record to the other segment, the adjacent IBH 140, or the non-adjacent higher level IBH 140 (block 1450). Referring again to the example of FIG. 3, a data bus 130 at segment 1, connected to IBH 140-$L_1$, may receive a read request data unit from a consumer located in segment $m_1$ connected to IBH 140-$M_1$. The data bus 130 at segment 1, connected to IBH 140-$L_1$, retrieves the requested record from a local topic and passes the requested record to IBH 140-$L_1$ which, in turn, passes the requested record to IBH 140-$M_1$. Upon receipt, IBH 140-$M_1$ conveys the requested record to the data bus 130 at segment $m_1$ for storing in a local topic from which the requesting consumer may subsequently read the record.

The exemplary process of FIG. 14 may be repeated for each read request data unit received at a data bus 130.

Figure 15:
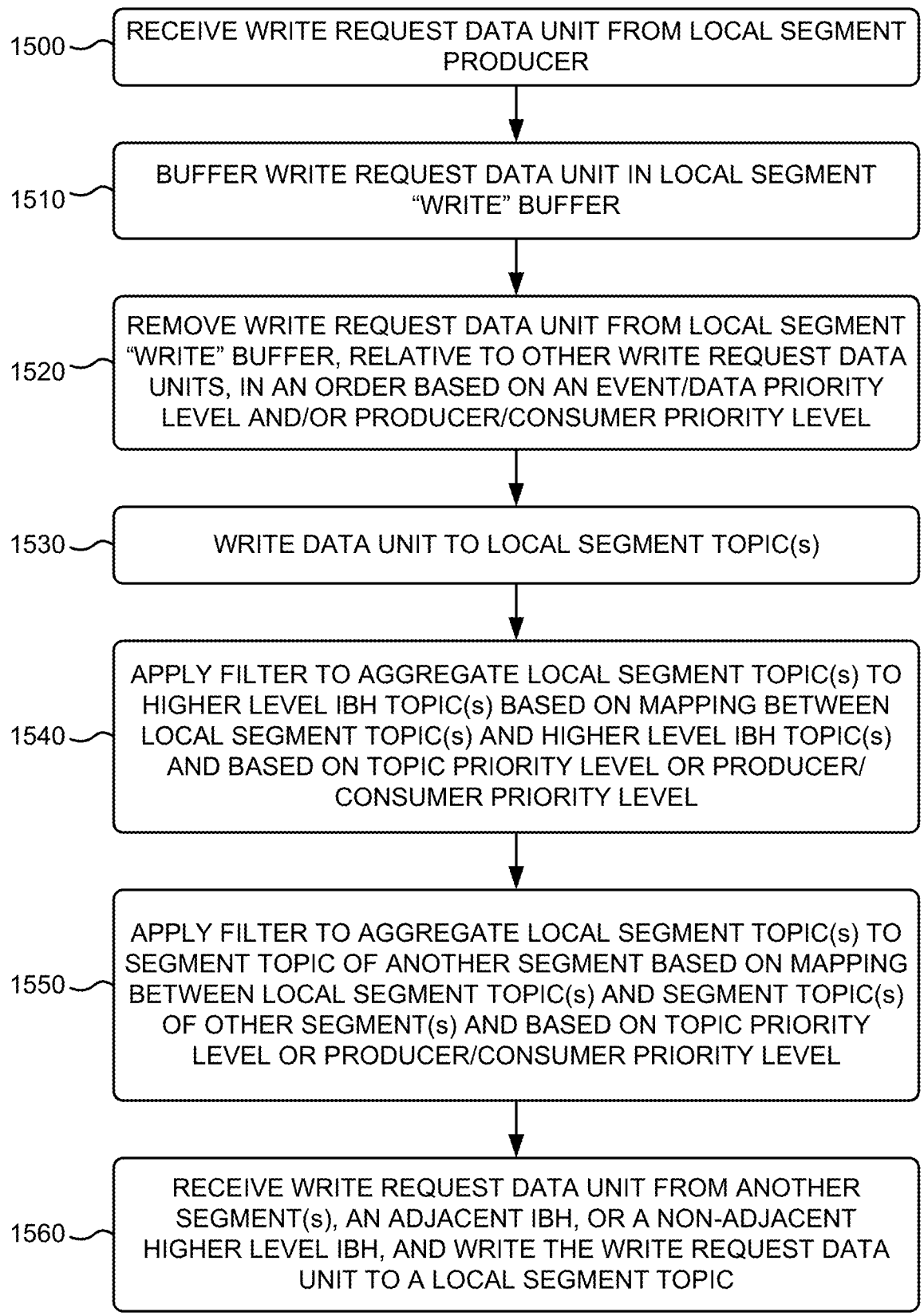
FIG. 15 illustrates an exemplary process for receiving, processing, and/or forwarding a write request data unit and writing a record corresponding to the write request data unit at a local segment data bus.

FIG. 15 illustrates an exemplary process for receiving, processing, and/or forwarding a write request data unit and writing a record corresponding to the write request data unit at a local segment data bus 130. The exemplary process of FIG. 15 may be implemented, for example, by a data bus 130 within a data bus segment 200 of hierarchical data bus system 120.

The exemplary process includes a data bus 130 receiving a write request data unit from a local segment producer (block 1500). The producer sending the write request data unit to the data bus 130 may include any network entity within the local segment within network environment 100 including, for example, a component of ONAP 145 or a VNF 150. The write request data unit may include data in a same format, or in a similar format to, data unit 600 of FIG. 6. Referring to the example of FIG. 3, a data bus 130 associated with segment 1, connected to IBH 140-$L_1$, may receive a write request data unit from a producer within segment 1.

The data bus 130 buffers the write request data unit in a local segment "write" buffer (block 1510). The data bus 130 stores the write request data unit in one of the locally maintained buffers (e.g., data queues) in memory (e.g., memory 530) that stores incoming write request data units. The "write" buffer may act as temporary storage for a stream of incoming write request data units that enables the data bus 130 to store, and selectively retrieve, the data units from the buffer based on certain criteria, such as a priority level of the event/data described in the data unit or based on a priority level of the consumer that is the destination for the write request data unit or a priority level of the producer that sourced the record that is being requested to be written to a topic of the data bus 130.

The data bus 130 removes the write request data unit from the local segment "write" buffer, relative to other write request data units, in an order based on an event/data priority level or a producer/consumer priority level (block 1520). The data bus 130 may analyze the event/data priority level field 630 and/or consumer/producer priority level field 635 of the write request data unit 600 and selectively retrieve the write request data unit from the "write" buffer based on the priority level(s). For example, write request data units having a high priority level in event/data priority level field 630 may be retrieved from the "write" buffer before data units having a lower priority level. As another example, write request data units having a high consumer or producer priority level in field 635 may be retrieved from the "write" buffer before data units having a lower priority level.

The data bus 130 writes the write request data unit to a record of a local segment topic(s) (block 1530). The data bus 130 identifies the target topic(s), within the local segment, of the write request data unit retrieved from the "write" buffer and stores the write request data unit as a record in the target topic. Referring to FIG. 7, if topic 2 (partition 2) 700-2 of the partitioned log is the target of the write request data unit, data bus 130 identifies a next unused record in topic 2, and stores the write request data unit in the next record (e.g., record 6 715 shown in FIG. 7).

The data bus 130 applies a filter to aggregate the local segment topic(s) to higher level IBH topic(s) based on a mapping between the local segment topic(s) and the higher level IBH topic(s) and based on a topic priority level or producer/consumer priority level (block 1540). The mapping between the local segment topic(s) and the higher level IBH topic(s) may have been created in block 1215 of the data bus configuration process of FIG. 12. The set of filter rules for aggregating local segment topics to higher level IBH topics may have been created in block 1225 of the data bus configuration process of FIG. 12. The set of filter rules for filtering the records at the local segment topics may identify destinations, sources, segment IDs, IBH IDs, topic IDs, event/data priority levels, consumer/producer priority levels, data types, time stamps, and/or matching data content in payload data that cause the corresponding records to be aggregated and stored in the records of a particular higher level IBH topic. As one example, a set of rules for aggregating local segment topics may specify a particular data type that causes records in the topics stored at the data bus 130, having a matching data type, to be retrieved and stored at a higher level IBH topic. The set of rules may additionally specify that data associated with certain event/data priority levels and/or certain consumer/producer priority levels is to be aggregated in a particular higher level IBH topic. For example, the set of rules may specify that all data units, stored in any topic at a data bus 130 and having a high event/data priority level, are to be aggregated and stored in a topic x at an adjacent, higher level IBH 140. As another example, the set of rules may specify that all data units, stored in any topic at a data bus 130 and destined for a particular consumer, are to be aggregated and stored in a topic_q at an adjacent, higher level IBH 140.

The data bus 130 applies a filter to aggregate the local segment topic(s) to a segment topic of another segment based on a mapping between a local segment topic(s) and a segment topic(s) of the other segment(s) and based on a topic priority level or producer/consumer priority level (block 1550). The mapping between the local segment topic(s) in the local segment and the segment topic(s) in another segment(s) may have been created in block 1220 of the data bus configuration process of FIG. 12. The set of filter rules for aggregating local segment topics to segment topics of other segments may have been created in block 1230 of the data bus configuration process of FIG. 12. The set of filter rules for filtering the records at the local segment topics may identify destinations, sources, segment IDs, IBH IDs, topic IDs, event/data priority levels, consumer/producer priority levels, data types, time stamps, and/or matching data content in payload data that cause the corresponding records to be aggregated and stored in the records of a particular segment topic of a data bus 130 at another segment. As one example, a set of rules generated for aggregating local segment topics to a segment topic(s) at another data bus 130 may specify a particular data type that causes records in the topics stored at the data bus 130, having a matching data type, to be retrieved and stored at a segment topic at another, different data bus 130. The set of rules may additionally specify that certain event/data priority levels and/or certain consumer/producer priority levels are to be aggregated in a particular segment topic at another data bus 130 at a different segment. For example, the set of rules may specify that all data units, stored in any topic at a first data bus 130 and having a low event/data priority level, are to be aggregated and stored in a topic x at another, second data bus 130. As another example, the set of rules may specify that all data units, stored in any topic at the first data bus 130 and sourced from a particular producer, are to be aggregated and stored in a topic_q at another, second data bus 130.

The data bus 130 receives a write request data unit from another segment(s), an adjacent IBH 140, or a non-adjacent higher level IBH 140, and writes the write request data unit to a local segment topic (block 1560). Referring to FIG. 3, in one example, data bus 130, within segment 1 and connected to IBH 140-$M_1$, may receive a write request data unit from another data bus 130, within segment $m_1$ and connected to IBH 140-$M_1$. In another example, data bus 130, within segment 1 and connected to IBH 140-$M_1$, may receive a write request data unit from adjacent IBH 140-$L_1$. In a further example, data bus 130, within segment $m_y$ and connected to IBH 140-$L_x$, may receive a write request data unit from IBH 140-H (via IBH 140-$M_1$).

The exemplary process of FIG. 15 may be repeated for each write request data unit received at a data bus 130.

Figure 16:
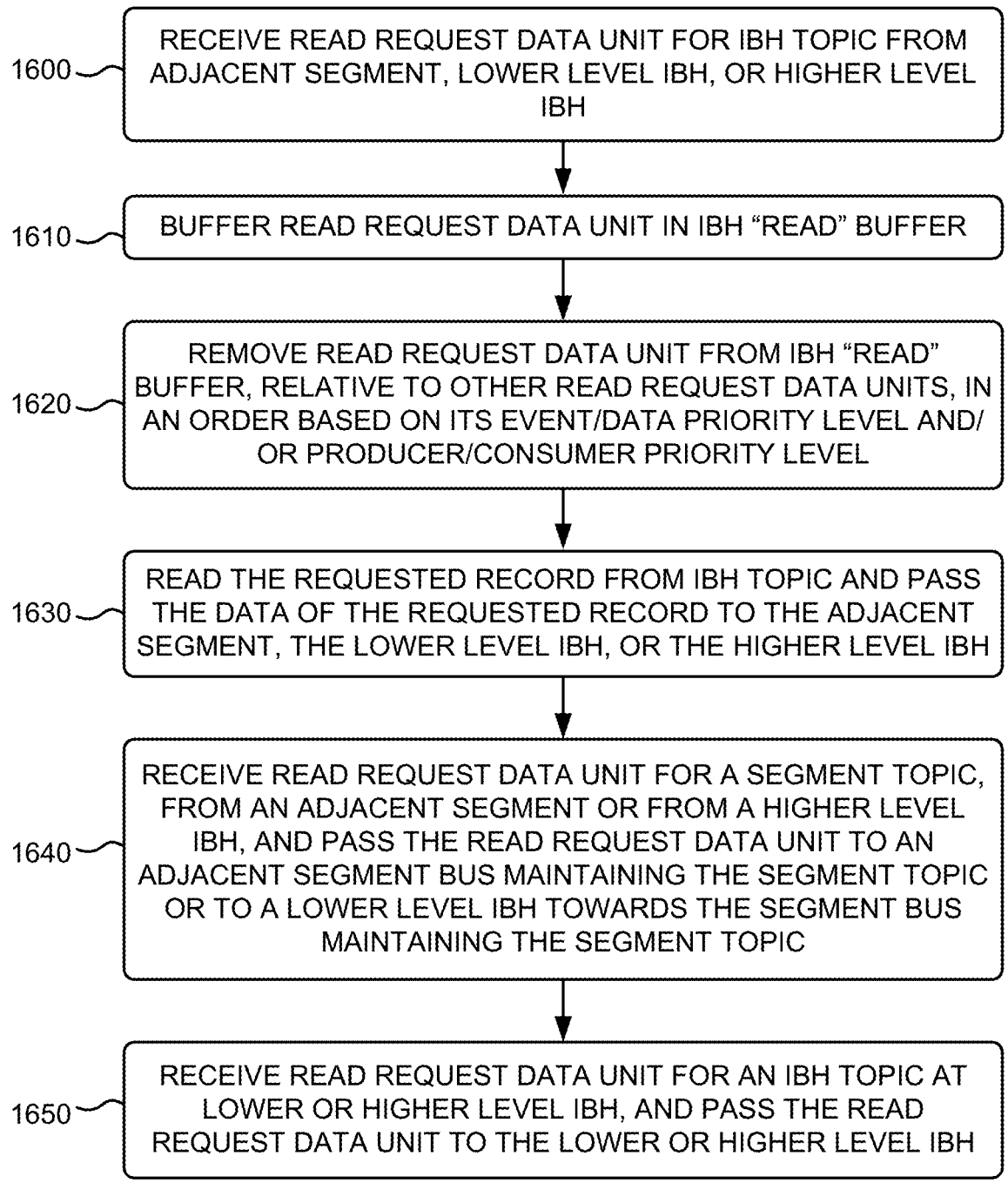
FIG. 16 illustrates an exemplary process for receiving, processing, forwarding, and/or retrieving a record corresponding to, a read request at an inter-bus hub.

FIG. 16 illustrates an exemplary process for receiving, processing, forwarding, and/or retrieving a record corresponding to, a read request at an IBH 140. The exemplary process of FIG. 16 may be implemented, for example, by an IBH 140 of hierarchical data bus system 120, including a lower level IBH 140, a mid-level IBH 140, or a higher level IBH 140.

The exemplary process includes IBH 140 receiving a read request data unit from an adjacent segment, lower level IBH, or higher level IBH (block 1600). The consumer that originated the read request data unit received at the IBH 140 may include any network entity within network environment 100 including, for example, a component of ONAP 145 or a VNF 150. The read request data unit may include data in the same format, or in a format similar to, data unit 600 of FIG. 6. Referring to FIG. 3, in one example, IBH 140-$M_1$ may receive a read request data unit from segment $m_1$ connected to IBH 140-$M_1$, from lower level IBH 140-$L_1$, or from IBH 140-H.

The IBH 140 buffers the read request data unit in the IBH "read" buffer (block 1610). The IBH 140 stores the read request data unit in one of the locally maintained buffers (e.g., data queues) in memory (e.g., memory 530) that stores incoming read request data units. The "read" buffer may act as temporary storage, for a stream of incoming read request data units, that enables the IBH 140 to store, and selectively retrieve, the data units from the buffer based on certain criteria, such as a priority level of the event/data described in the data unit or based on a priority level of the consumer sending the read request data unit or a priority level of the producer that originated the record that is being requested to be read from a topic of the IBH 140.

The IBH 140 removes the read request data unit from the IBH "read" buffer, relative to other read request data units, in an order based on its event/data priority level and/or producer/consumer priority level (block 1620). The IBH 140 may analyze the event/data priority level field 630 and/or consumer/producer priority level field 635 of the read request data unit 600 and selectively retrieve the read request data unit from the "read" buffer based on the priority level(s). For example, read request data units having a high priority level in event/data priority level field 630 may be retrieved from the "read" buffer before data units having a lower priority level. As another example, read request data units having a higher consumer or producer priority level in field 635 may be retrieved from the "read" buffer before data units having a lower priority level.

The IBH 140 reads the requested record from the IBH topic and passes the data of the requested record to the adjacent segment, the lower level IBH, or the higher level IBH (block 1630). The IBH 140 analyzes the read request data unit retrieved from the "read" buffer and determines that the requested record is stored in a topic maintained at the IBH 140. The IBH 140 identifies the topic storing the requested record, locates the requested record (at a particular offset), and retrieves the record from the identified topic at IBH 140. The IBH 140 may pass the retrieved record to the adjacent segment, the lower level IBH, or the higher level IBH at which the requesting consumer resides. Referring to FIG. 3, in one example, a read request may originate from a consumer in segment $M_y$ connected to IBH 140-L, and may request a record from a topic maintained at data bus 130 within segment $m_1$ connected to IBH 140-$M_1$. Upon receipt of the read request data unit from IBH 140-$L_x$, IBH 140-$M_1$ passes the data unit to the data bus 130 at the adjacent segment $m_1$.

The IBH 140 receives a read request data unit for a segment topic, from an adjacent segment or from a higher level IBH, and passes the read request data unit to an adjacent segment maintaining the segment topic or to a lower level IBH towards the segment data bus 130 maintaining the segment topic (block 1640). The read request data unit for the segment topic may request reading a record stored at a segment topic maintained at an adjacent segment data bus 130, at a segment data bus 130 connected to a lower level IBH 140, or at a segment data bus 130 connected to a higher level IBH 140. Referring to FIG. 3, in one example, IBH 140-$M_1$ may receive a read request data unit, from IBH 140-H, for a segment topic maintained at segment 1, connected to IBH 140-$L_x$. IBH 140-$M_1$ passes the read request data unit to IBH 140-$L_x$ which, in turn, passes the read request data unit to data bus 130 within segment 1.

The IBH 140 receives a read request data unit for an IBH topic at a lower or higher level IBH 140, and passes the read request data unit to the lower or higher level IBH 140 (block 1650). The read request data unit for may request reading a record stored at an IBH topic maintained at either a lower or higher level IBH 140 from the IBH 140 that received the read request data unit. Referring to FIG. 3, in one example, IBH 140-$M_1$ may receive a read request data unit for an IBH topic maintained at IBH 140-H. In another example, IBH 140-$M_1$ may receive a read request data unit for an IBH topic maintained at IBH 140-$L_1$.

The exemplary process of FIG. 16 may be repeated for each read request data unit received at an IBH 140.

Figure 17:
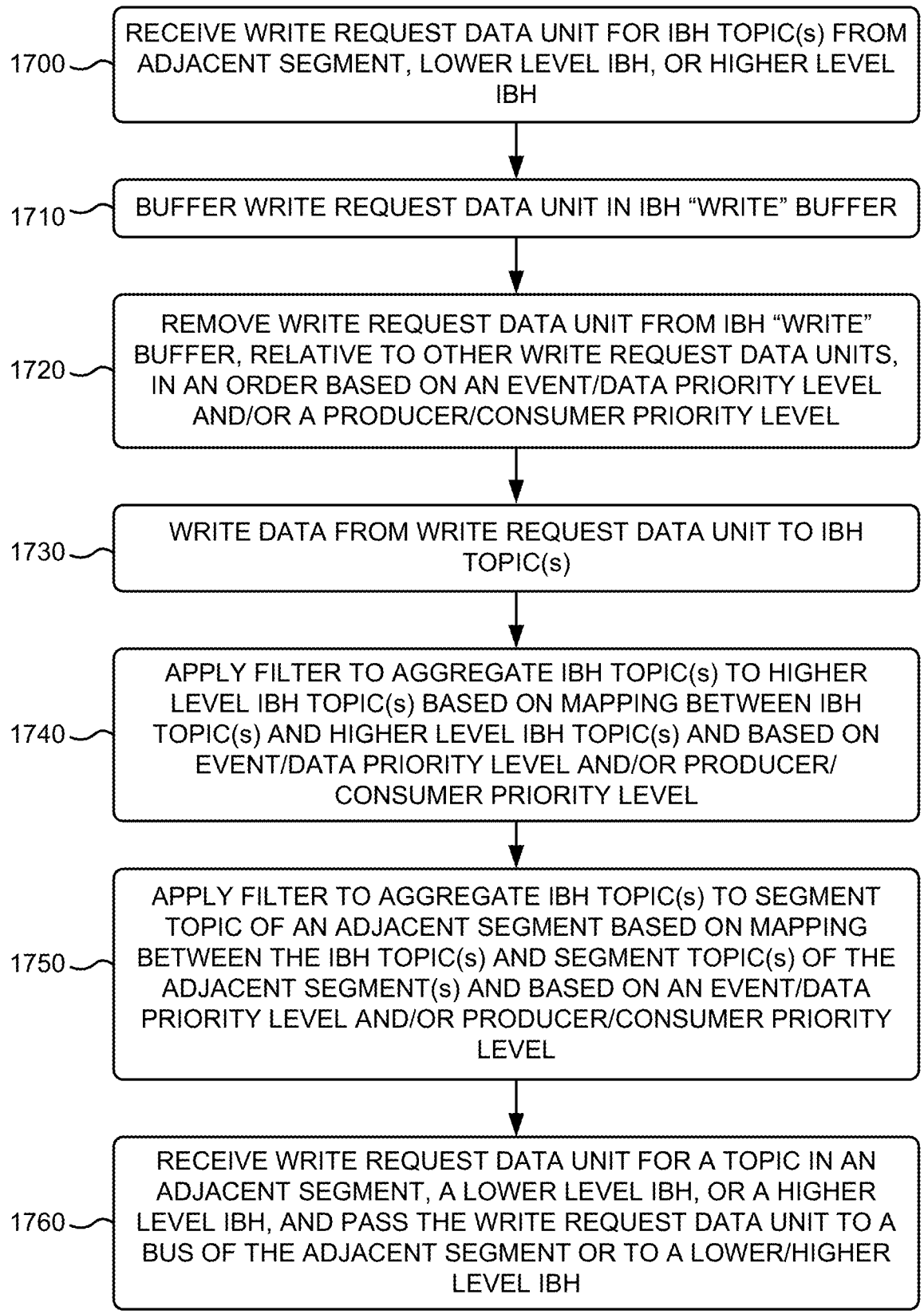
FIG. 17 illustrates an exemplary process for receiving, processing, forwarding, and/or writing a record corresponding to, a write request at an inter-bus hub.

FIG. 17 illustrates an exemplary process for receiving, processing, forwarding, and/or writing a record corresponding to, a write request at an IBH 140. The exemplary process of FIG. 17 may be implemented, for example, by an IBH 140 within hierarchical data bus system 120, including a lower level IBH 140, a mid-level IBH 140, or a higher level IBH 140.

The exemplary process includes an IBH 140 receiving a write request data unit for an IBH topic(s) from an adjacent segment, a lower level IBH 140, or a higher level IBH 140 (block 1700). The producer sending the write request data unit to the IBH 140 may include any network entity within an adjacent segment, a non-adjacent segment connected to a lower level IBH 140, or a non-adjacent segment connected to a higher level IBH 140 within network environment 100. The network entity may include, for example, a component of ONAP 145 or a VNF 150. The write request data unit may include data in a same format, or in a format similar to, data unit 600 of FIG. 6. Referring to FIG. 3, in one example, IBH 140-$M_1$ may receive a write request data unit for an IBH topic maintained at IBH 140-$M_1$ from a producer within segment 1 connected to IBH 140-$M_1$, from lower level IBH 140-L, or from higher level IBH 140-H.

The IBH 140 buffers the write request data unit in the IBH "write" buffer (block 1710). The IBH 140 stores the write request data unit in one of the locally maintained buffers (e.g., data queues) in memory (e.g., memory 530) that stores incoming write request data units. The "write" buffer may act as temporary storage, for a stream of incoming write request data units, that enables the IBH 140 to store, and selectively retrieve, the data units from the buffer based on certain criteria, such as a priority level of the event/data described in the data unit or based on a priority level of the consumer that is the destination for the write request data unit or a priority level of the producer that sourced the record that is being requested to be written to a topic of the IBH 140.

The IBH 140 removes the write request data unit from the IBH "write" buffer, relative to other write request data units, in an order based on an event/data priority level and/or a producer/consumer priority level (block 1720). The IBH 140 may analyze the event/data priority level field 630 and/or consumer/producer priority level field 635 of the write request data unit 600 and selectively retrieve the write request data unit from the "write" buffer based on the priority level(s). For example, write request data units having a high priority level in event/data priority level field 630 may be retrieved from the "write" buffer before data units having a lower priority level. As another example, write request data units having a high consumer or producer priority level in field 635 may be retrieved from the "write" buffer before data units having a lower priority level.

The IBH 140 writes the write request data unit to the IBH topic(s) (block 1730). The IBH 140 identifies the target IBH topic(s) maintained at the IBH 140, of the write request data unit retrieved from the "write" buffer, and stores the write request data unit as a record in the target IBH topic. Referring to FIG. 7, if topic n (partition n) 700-$n$ of the partitioned log is the target of the write request data unit, IBH 140 identifies a next unused record in topic n, and stores the write request data unit in the next record (e.g., record 4 720 shown in FIG. 7).

The IBH 140 applies a filter to aggregate the IBH topic(s) to a higher level IBH topic(s) based on a mapping between IBH topics and higher level IBH topics and based on an event/data priority level and/or producer/consumer priority level (block 1740). The mapping between the IBH topic(s) and the higher hierarchical level IBH topics may have been created in block 1320 of the IBH bus configuration process of FIGS. 13A and 13B. The set of filter rules for aggregating IBH topics to higher hierarchical level IBH topics may have been created in block 1355 of the IBH configuration process of FIGS. 13A and 13B. The set of filter rules for filtering the records at the IBH topics may identify destinations, sources, segment IDs, IBH IDs, topic IDs, event/data priority levels, consumer/producer priority levels, data types, time stamps, and/or matching data content in payload data that cause the corresponding records to be aggregated and stored in the records of a particular higher hierarchical level IBH topic of a higher level IBH 140. As one example, a set of rules generated for aggregating IBH topics to a higher hierarchical level IBH topic(s) may specify a particular data type that causes records in the topics stored at the IBH 140, having a matching data type, to be retrieved and stored at an IBH topic at another, higher level IBH 140. The set of rules may additionally specify that certain event/data priority levels and/or certain consumer/producer priority levels are to be aggregated in a particular IBH topic(s) at another IBH 140. For example, the set of rules may specify that all data units, stored in any topic at a first IBH 140 and having a high event/data priority level, are to be aggregated and stored in a topic x at another, higher level IBH 140. As another example, the set of rules may specify that all data units, stored in any topic at the first IBH 140 and destined for a particular consumer(s), are to be aggregated and stored in a topic_p at another, higher level IBH 140.

The IBH 140 applies a filter to aggregate IBH topic(s) to a segment topic(s) of an adjacent segment based on a mapping between the IBH topic(s) and the segment topic(s) of the adjacent segment(s) and based on an event/data priority level and/or producer/consumer priority level (block 1750). The mapping between the topics at adjacent segments and the topics at the IBH 140 may have been created in block 1315 of the IBH configuration process of FIGS. 13A and 13B. The set of filter rules for aggregating local segment topics to IBH topics may have been created in block 1350 of the IBH configuration process of FIGS. 13A and 13B. The set of filter rules for filtering the records at the IBH topics may identify destinations, sources, segment IDs, IBH IDs, topic IDs, event/data priority levels, consumer/producer priority levels, data types, time stamps, and/or matching data content in payload data that cause the corresponding records to be aggregated and stored in the records of a particular segment topic(s) of a segment data bus 130 of an adjacent segment.

As one example, a set of rules for aggregating IBH topics to a segment topic(s) at a data bus 130 of an adjacent segment may specify a particular data type that causes records in the topics stored at the IBH 140, having a matching data type, to be retrieved and stored at a segment topic at a data bus 130 in an adjacent segment. The set of rules may additionally specify that certain event/data priority levels and/or certain consumer/producer priority levels are to be aggregated in a particular segment topic at the data bus 130 in the adjacent segment. For example, the set of rules may specify that all data units, stored in any topic at IBH 140 and having a low event/data priority level, are to be aggregated and stored in a topic x at a data bus 130 of a segment that is adjacent to the IBH 140. As another example, the set of rules may specify that all data units, stored in any topic at the IBH 140 and sourced from a particular producer, are to be aggregated and stored in a topic_q at a data bus 130 of a particular segment that is adjacent to the IBH 140.

The IBH 140 receives a write request data unit for a topic in an adjacent segment, a lower level IBH 140, or a higher level IBH 140, and passes the write request data unit to a data bus 130 of the adjacent segment or to a lower/higher level IBH 140 (block 1760). Referring to FIG. 3, in one example, IBH 140-$M_1$ may receive a write request data unit from a producer that is destined to be written to a topic at a data bus 130 within segment $m_1$ connected to IBH 140-$M_1$, to a topic maintained at IBH 140-$L_1$, or to a topic maintained at IBH 140-H. In this example, IBH 140-$M_1$ may pass the write request data unit to the data bus 130 within the local segment $m_1$, to lower level IBH 140-$L_1$, or to higher level IBH 140-H.

The exemplary process of FIG. 17 may be repeated for each write request data unit received at an IBH 140 within hierarchical data bus system 120.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 12, 13A, 13B, and 14-17, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   creating, at a first inter-bus hub in a hierarchical data bus system, a partitioned log comprising a first partition and a second partition, wherein the first inter-bus hub is coupled to a first data bus residing in a first segment and to a second data bus residing in a second segment, wherein at least one of the first data bus, the second data bus, or the first inter-bus hub comprises a Data Movement as a Platform (DMaaP) system;
   filtering, by the first inter-bus hub based on at least one set of rules, first streams of records of the first segment to aggregate first data from the first data bus, wherein the at least one set of rules identify first destinations, first sources, first segment identifiers, first inter-bus hub identifiers, first topic identifiers, first data priority levels, first data types, and first timestamps;
   storing, by the first inter-bus hub, the first data in the first partition;
   filtering, by the first inter-bus hub based on the at least one set of rules, second streams of records of the second segment to aggregate second data from the second data bus, wherein the at least one set of rules further identify second destinations, second sources, second segment identifiers, second inter-bus hub identifiers, second topic identifiers, second data priority levels, second data types, and second timestamps;
   storing, by the first inter-bus hub, the second data in the second partition;
   relaying, by the first inter-bus hub, the first data from the first partition to one of the first destinations; and
   relaying, by the first inter-bus hub, the second data from the second partition to one of the second destinations.

2. The method of claim 1, wherein the first data bus, the second data bus, and the first inter-bus hub each comprise a Data Movement as a Platform (DMaaP) system.

3. The method of claim 2, wherein the DMaaP system comprises a distributed streaming platform that stores and publishes the first and second streams of records.

4. The method of claim 1, wherein the first destinations comprise one of:
 a third data bus residing in a third segment,
 a second inter-bus hub that resides at a higher level within the hierarchical data bus system than the first inter-bus hub, or
 a third inter-bus hub that resides at a lower level within the hierarchical data bus system than the first inter-bus hub.

5. The method of claim 4, wherein relaying the first data to one of the first destinations further comprises:
 relaying the first data for storing in a third partition at the third data bus,
 relaying the first data for storing in a fourth partition at the second inter-bus hub, or
 relaying the first data for storing in a fifth partition at the third inter-bus hub.

6. The method of claim 1, wherein the partitioned log at the first inter-bus hub further comprises a third partition and a fourth partition, the method further comprising:
 retrieving third data stored in the third partition;
 passing the third data to the first data bus for storing in a fifth partition at the first data bus;
 retrieving fourth data stored in the fourth partition; and
 passing the fourth data to the second data bus for storing in a sixth partition at the second data bus.

7. A non-transitory storage medium storing instructions executable by one or more network devices implementing a first inter-bus hub in a hierarchical data bus system, wherein the instructions comprise instructions to cause the one or more network devices to:
 create a partitioned log comprising a first partition and a second partition;
 filter, by the first inter-bus hub based on at least one set of rules, first streams of records to aggregate first data from a first data bus residing in a first segment and coupled to the first inter-bus hub, wherein the at least one set of rules identify first destinations, first sources, first segment identifiers, first inter-bus hub identifiers, first topic identifiers, first data priority levels, first data types, and first timestamps;
 store, by the first inter-bus hub, the first data in the first partition;
 filter, by the first inter-bus hub based on the at least one set of rules, second streams of records to aggregate second data from a second data bus residing in a second segment and coupled to the first inter-bus hub, wherein the at least one set of rules further identify second destinations, second sources, second segment identifiers, second inter-bus hub identifiers, second topic identifiers, second data priority levels, second data types, and second timestamps;
 store, by the first inter-bus hub, the second data in the second partition;
 relay, by the first inter-bus hub, the first data from the first partition to one of the first destinations; and
 relay, by the first inter-bus hub, the second data from the second partition to one of the second destinations, wherein at least one of the first data bus, the second data bus, or the first inter-bus hub comprises a Data Movement as a Platform (DMaaP) system.

8. The non-transitory storage medium of claim 7, wherein the first data bus, the second data bus, and the first inter-bus hub each comprise a Data Movement as a Platform (DMaaP) system, and wherein the first destinations comprise one of:
 a third data bus residing in a third segment,
 a second inter-bus hub that resides at a higher level within the hierarchical data bus system than the first inter-bus hub, or
 a third inter-bus hub that resides at a lower level within the hierarchical data bus system than the first inter-bus hub.

9. The non-transitory storage medium of claim 8, wherein the instructions comprise instructions to cause the one or more network devices to:
 relay the first data for storing in a third partition at the third data bus,
 relay the first data for storing in a fourth partition at the second inter-bus hub, or
 relay the first data for storing in a fifth partition at the third inter-bus hub.

10. The non-transitory storage medium of claim 7, wherein the first data bus, the second data bus, and the first inter-bus hub each comprise a Data Movement as a Platform (DMaaP) system.

11. The non-transitory storage medium of claim 10, wherein the DMaaP system comprises a distributed streaming platform that stores and publishes the first and second streams of records.

12. The non-transitory storage medium of claim 7, wherein the first destinations comprise one of:
 a third data bus residing in a third segment,
 a second inter-bus hub that resides at a higher level within the hierarchical data bus system than the first inter-bus hub, or
 a third inter-bus hub that resides at a lower level within the hierarchical data bus system than the first inter-bus hub.

13. The non-transitory storage medium of claim 7, wherein the partitioned log at the first inter-bus hub comprises a third partition and a fourth partition, and wherein the instructions comprise instructions to cause the one or more network devices to:
 retrieve third data stored in the third partition;
 pass the third data to the first data bus for storing in a fifth partition at the first data bus;
 retrieve fourth data stored in the fourth partition; and
 pass the fourth data to the second data bus for storing in a sixth partition at the second data bus.

14. One or more network devices implementing a first inter-bus hub that is coupled to a first data bus residing in a first segment and to a second data bus residing in a second segment of a hierarchical data bus system, wherein at least one the first data bus, the second data bus, and the first inter-bus hub comprises a Data Movement as a Platform (DMaaP) system, the one or more network devices comprising:
 a memory; and
 a processing unit configured to:
 create, in the memory, a partitioned log comprising a first partition and a second partition,
 filter, based on at least one set of rules, first streams of records of the first segment to aggregate first data from the first data bus, wherein the at least one set of rules identify first destinations, first sources, first segment identifiers, first inter-bus hub identifiers, first topic identifiers, first data priority levels, first data types, and first timestamps;
 store the first data in the first partition;

filter, based on the at least one set of rules, second streams of records of the second segment to aggregate second data from the second data bus, wherein the at least one set of rules further identify second destinations, second sources, second segment identifiers, second inter-bus hub identifiers, second topic identifiers, second data priority levels, second data types, and second timestamps;

store the second data in the second partition;

relay the first data from the first partition to one of the first destinations, and relay the second data from the second partition to one of the second destinations.

15. The one or more network devices of claim 14, wherein the first data bus, the second data bus, and the first inter-bus hub each comprise a Data Movement as a Platform (DMaaP) system.

16. The one or more network devices of claim 15, wherein the DMaaP system comprises a distributed streaming platform that stores and publishes the first and second streams of records.

17. The one or more network devices of claim 14, wherein the first destination comprises one of:
a third data bus residing in a third segment,
a second inter-bus hub that resides at a higher level within the hierarchical data bus system than the first inter-bus hub, or
a third inter-bus hub that resides at a lower level within the hierarchical data bus system than the first inter-bus hub.

18. The one or more network devices of claim 17, wherein, when relaying the first data to the first destination, the processing unit is configured to:
relay the first data for storing in a third partition at the third data bus,
relay the first data for storing in a fourth partition at the second inter-bus hub, or
relay the first data for storing in a fifth partition at the third inter-bus hub.

19. The one or more network devices of claim 14, wherein the partitioned log at the first inter-bus hub comprises a third partition, and wherein the processing unit is further configured to:
retrieve third data stored in the third partition, and
pass the third data to the first data bus for storing in a fourth partition at the first data bus.

20. The one or more network devices of claim 19, wherein the partitioned log at the first inter-bus hub comprises a fifth partition, and wherein the processing unit is further configured to:
retrieve fourth data stored in the fifth partition, and
pass the fourth data to the second data bus for storing in a sixth partition at the second data bus.

* * * * *